US010682894B2

(12) United States Patent
Ito et al.

(10) Patent No.: US 10,682,894 B2
(45) Date of Patent: Jun. 16, 2020

(54) AIR SUSPENSION SYSTEM

(71) Applicant: Hitachi Automotive Systems, Ltd., Ibaraki (JP)

(72) Inventors: Tsutomu Ito, Kanagawa (JP); Shunsuke Mori, Kanagawa (JP); Tomoyuki Lee, Kanagawa (JP); Tsutomu Iwamura, Kanagawa (JP); Yuki Yoshida, Kanagawa (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 89 days.

(21) Appl. No.: 15/562,161

(22) PCT Filed: May 29, 2015

(86) PCT No.: PCT/JP2015/065667
§ 371 (c)(1),
(2) Date: Sep. 27, 2017

(87) PCT Pub. No.: WO2016/194080
PCT Pub. Date: Dec. 8, 2016

(65) Prior Publication Data
US 2018/0079273 A1 Mar. 22, 2018

(51) Int. Cl.
*B60G 17/052* (2006.01)
*B60G 17/048* (2006.01)
(Continued)

(52) U.S. Cl.
CPC .......... *B60G 17/048* (2013.01); *B60G 11/27* (2013.01); *B60G 17/015* (2013.01);
(Continued)

(58) Field of Classification Search
CPC .............................. B60G 17/0523
See application file for complete search history.

(56) References Cited

U.S. PATENT DOCUMENTS 4,518,169 A * 5/1985 Kuroki ............... B60G 17/0165
180/41
6,726,189 B2 * 4/2004 Folchert ............. B60G 17/0523
267/64.16
(Continued)

FOREIGN PATENT DOCUMENTS

DE       10322578 B3 *  9/2004  ......... B60G 17/0523
DE  102004038711 A1 *  2/2006  ......... B60G 17/0523
(Continued)

OTHER PUBLICATIONS

International Search Report dated Aug. 25, 2015 for WO 2016/194080 A1.

Primary Examiner — Nicole T Verley
(74) Attorney, Agent, or Firm — Abelman, Frayne & Schwab

(57) ABSTRACT

A replenishment passage connects a compressor to a tank, and a first check valve is provided in the middle of the replenishment passage. A supply/discharge passage connects the tank to air suspensions. A supply/discharge switching valve is provided in the middle of the supply/discharge passage, and suspension control valves are provided at a location between the supply/discharge switching valve and the air suspensions. A discharge passage connects the supply/discharge switching valve to a suction port of the compressor, and a discharge passage open/close valve is provided in the middle of the discharge passage. When a vehicle height is lowered, air within the air suspensions is guided to the suction port of the compressor through the discharge passage, compressed by the compressor, and supplied into the tank.

3 Claims, 13 Drawing Sheets

(51) Int. Cl.
*B60G 11/27* (2006.01)
*B60G 17/015* (2006.01)

(52) U.S. Cl.
CPC ....... *B60G 17/052* (2013.01); *B60G 17/0525* (2013.01); *B60G 2500/30* (2013.01)

(56) References Cited

U.S. PATENT DOCUMENTS

| | | | | |
|---|---|---|---|---|
| 7,032,895 B2 * | 4/2006 | Folchert | ............ | B60G 17/0523 267/64.28 |
| 7,097,166 B2 * | 8/2006 | Folchert | ............ | B60G 17/0523 267/64.28 |
| 7,441,789 B2 * | 10/2008 | Geiger | ............... | B60G 17/0155 280/124.157 |
| 7,862,061 B2 * | 1/2011 | Jung | ..................... | B60G 15/12 267/64.28 |
| 9,168,806 B2 * | 10/2015 | Kondo | ................. | B60G 21/073 |
| 9,205,719 B2 * | 12/2015 | Frank | ................. | B60G 17/0523 |
| 9,758,007 B2 * | 9/2017 | Kondo | ................. | B60G 17/017 |
| 9,938,981 B2 * | 4/2018 | Hein | ................. | B60G 17/0525 |
| 10,384,508 B2 * | 8/2019 | Ohashi | ............. | B60G 17/0165 |

FOREIGN PATENT DOCUMENTS

| | | | | |
|---|---|---|---|---|
| DE | 102017011527 A1 * | 6/2019 | ......... | B60G 17/0523 |
| JP | 1983-104711 U | 7/1983 | | |
| JP | 02-003516 A | 1/1990 | | |
| JP | 10-119531 A | 5/1998 | | |
| JP | 2009-046027 A | 3/2009 | | |
| JP | 2009046027 * | 3/2009 | ........... | B60G 17/052 |
| JP | 2009-160954 A | 7/2009 | | |
| JP | 2015-105020 A | 6/2015 | | |
| JP | 6268777 B2 * | 1/2018 | | |
| WO | WO-2017057224 A1 * | 4/2017 | ............. | F04B 27/02 |

* cited by examiner

AIR SUSPENSION SYSTEM

CROSS REFERENCE TO RELATED APPLICATIONS

This application is a national phase of PCT application No. PCT/JP2015/065667, filed on 29 May 2015, all of which are incorporated herein by reference.

TECHNICAL FIELD

The present invention relates to an air suspension system that is mounted in, for example, a vehicle such as, a four-wheeled automobile, and performs supply/discharge of air compressed by a compressor to/from an air suspension, thereby adjusting a vehicle height.

BACKGROUND

In general, in a vehicle such as a four-wheeled automobile, an air suspension system configured to adjust a vehicle height is mounted. The air suspension system includes an air suspension configured to adjust a vehicle height according to supply/discharge of air, a compressor configured to compress air to be supplied to the air suspension, and a high-pressure tank configured to store the air compressed by the compressor. In addition, the air suspension system is configured such that when the compressed air stored in the high-pressure tank is supplied to the air suspension, the vehicle height increases (see, for example, Patent Document 1).

Meanwhile, in the related art, in order to lower the vehicle height, air is discharged from the air suspension, and the discharged air is stored in a low-pressure tank. Then, the compressor compresses air having a pressure equal to or higher than an atmospheric pressure, which is stored in the low-pressure tank, and stores the compressed air in the high-pressure tank. Accordingly, a pressure difference between a suction side and a discharge side of the compressor may be suppressed, and the pressure when air is compressed by the compressor may be reduced.

PRIOR ART DOCUMENT

Patent Document

Patent Document 1: Japanese Patent Laid-Open Publication No. 2009-046027

DISCLOSURE OF THE INVENTION

However, the above described air suspension system according to the related art is configured to include two tanks, that is, a high-pressure tank which stores compressed air to be supplied to the air suspension when the vehicle height is increased, and a low-pressure tank which stores air discharged from the air suspension when the vehicle height is lowered.

Thus, when the air suspension system is mounted in the vehicle, there is a problem in that a space in which two tanks are provided becomes large. There is a problem in that the number of components constituting the air suspension system is increased, and as a result, the manufacturing cost increases.

The present invention has been made in consideration of the above described problems of the related technology, and an object of the present invention is to provide an air suspension system in which the number of tanks is reduced so as to achieve a reduction of an installation space, and a reduction of a manufacturing cost.

In order to solve the above described problems, an air suspension system according to the invention of claim 1 is configured by an air suspension interposed between a vehicle body and an axle so as to adjust a vehicle height according to supply/discharge of air, a compressor configured to compress air, a tank configured to store air compressed by the compressor, a replenishment passage configured to connect the compressor to the tank, a first check valve provided m the middle of the replenishment passage so as to allow a flow of air from the compressor to the tank and to prevent a flow in the opposite direction, a supply/discharge passage configured to connect the tank to the air suspension, a supply/discharge switching valve provided in the middle of the supply/discharge passage so as to switch between a supply position where air is supplied to the air suspension and a discharge position where air within the air suspension is discharged, a suspension control valve located between the supply/discharge switching valve and the air suspension and provided in the middle of the supply/discharge passage so as to open and close the supply/discharge passage and to control the extension and retraction of the air suspension, a return passage configured to connect the supply/discharge switching valve to the suction side of the compressor, and a return passage open/close valve provided m the middle of the return passage so as to open and close the return passage. In the configuration, when the vehicle height is lowered by the air suspension, the supply/discharge switching valve is switched to a discharge position, the supply/discharge passage is opened by the suspension control valve, the return passage is opened by the return passage open/close valve, and the compressor is operated such that the air within the air suspension is supplied into the tank through the return passage and the replenishment passage without being released to the atmosphere.

According to the present invention, the air suspension system may be configured using one high-pressure tank, and it is possible to reduce an installation space, and to reduce a manufacturing cost.

DETAILED DESCRIPTION TO EXECUTE THE INVENTION

Figure 1:
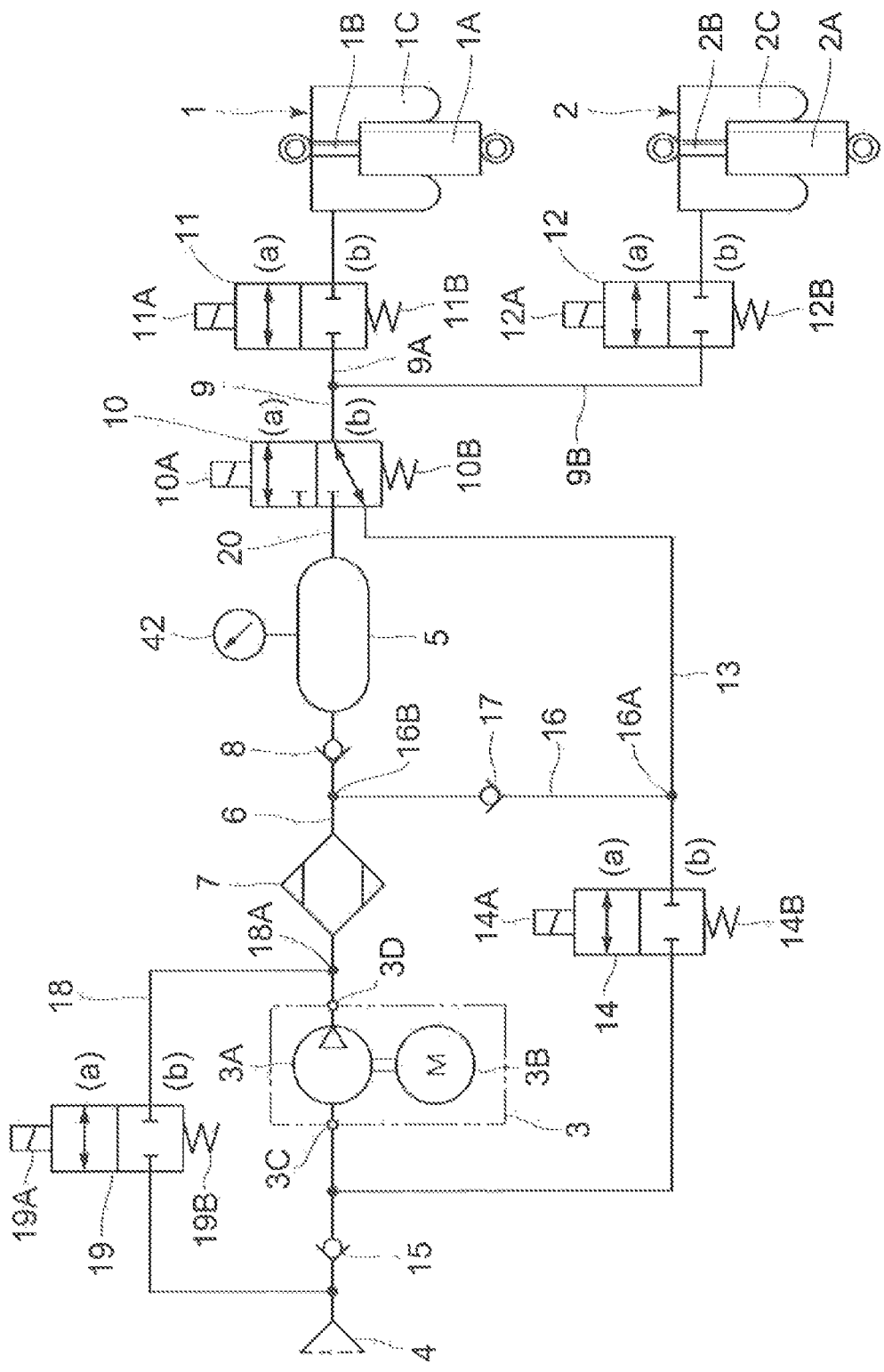
FIG. 1 is a circuit diagram illustrating an air suspension system according to a first exemplary embodiment of the present invention.
Figure 2:
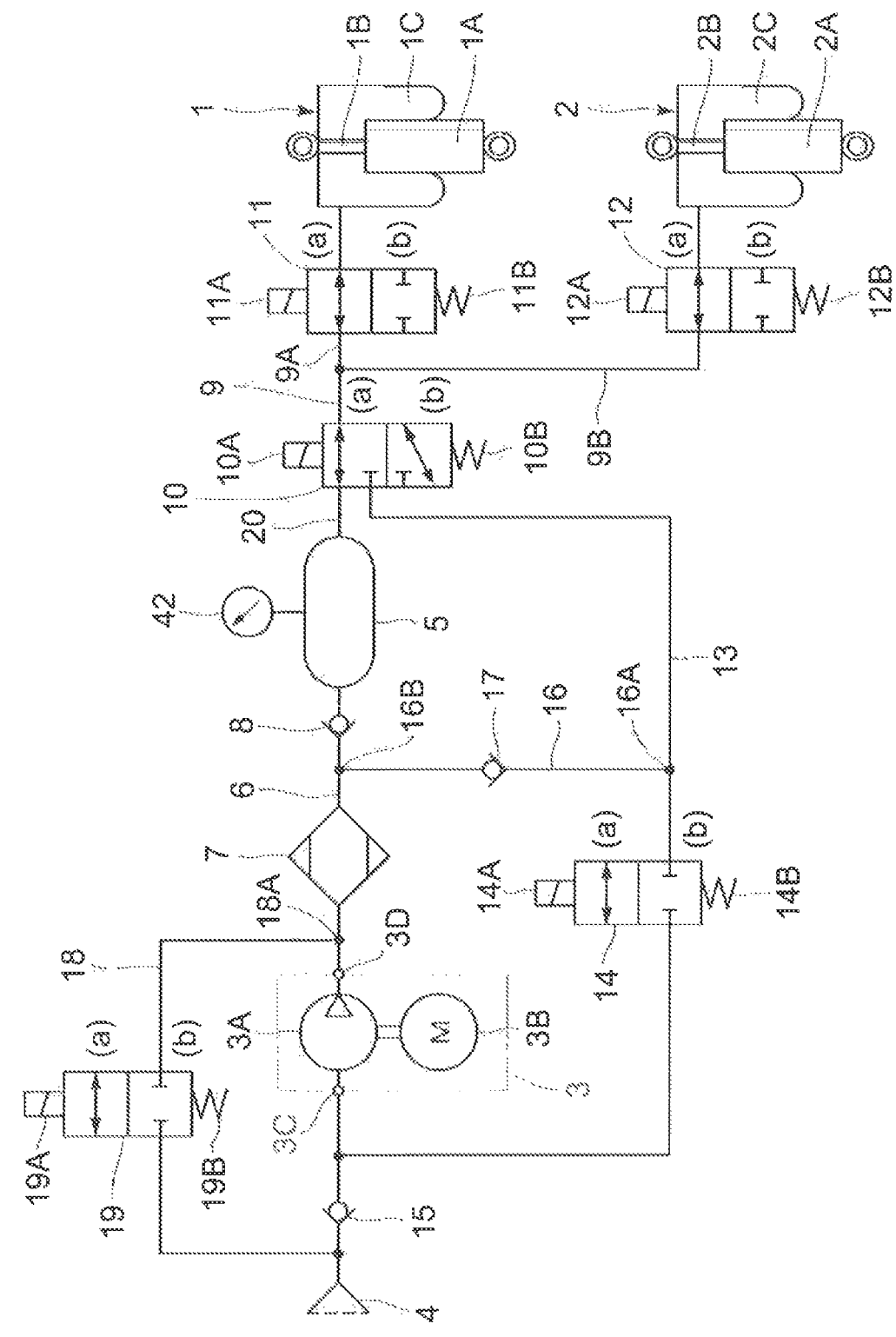
FIG. 2 is a circuit diagram illustrating a state where a vehicle height is raised by air suspensions.
Figure 3:
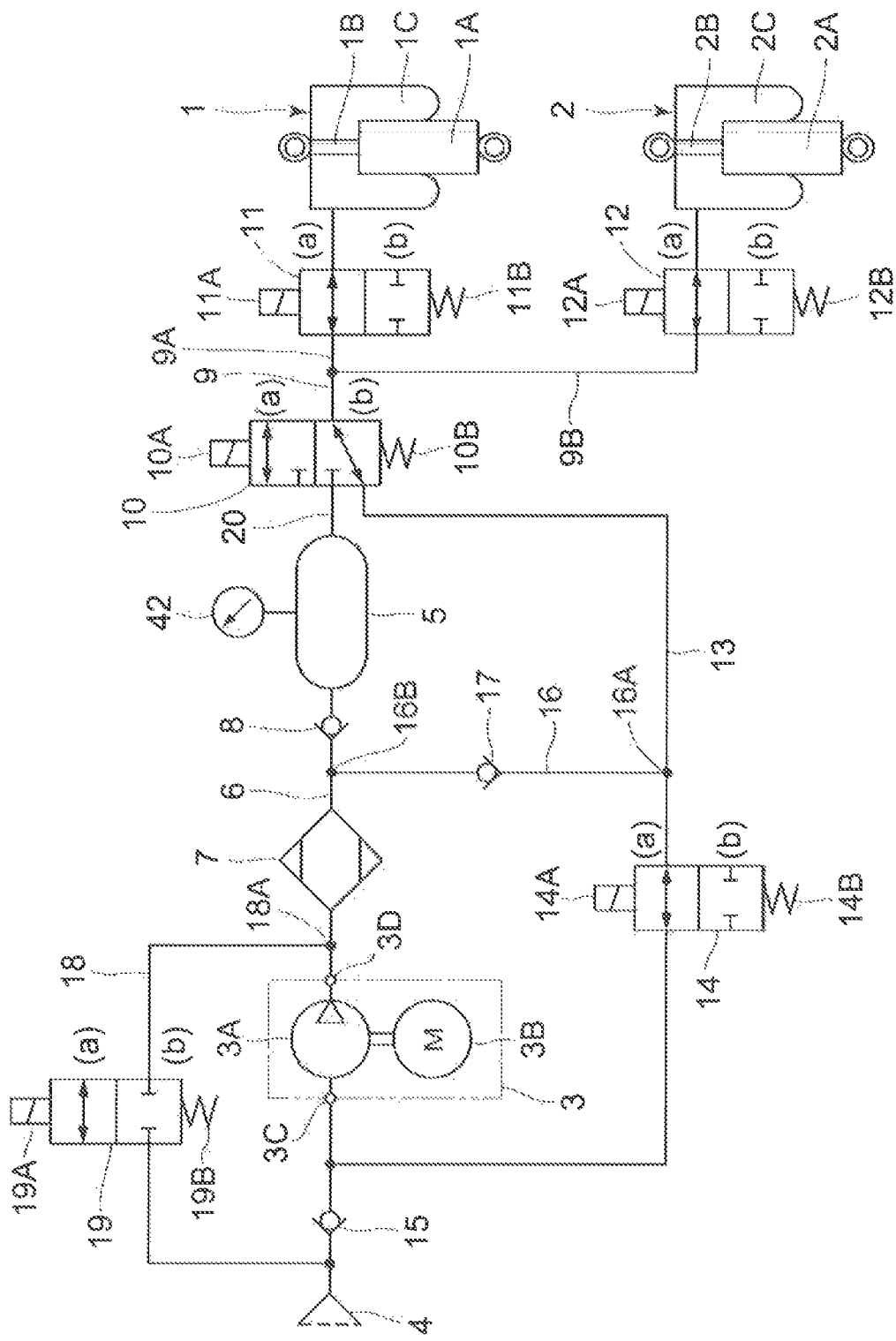
FIG. 3 is a circuit diagram illustrating a state where a vehicle height is lowered by air suspensions.

Hereinafter, an air suspension system according to the present invention will be described in detail with reference to FIG. 1 to FIG. 13. FIGS. 1 to 3 illustrate an air suspension system in the present invention according to a first exemplary embodiment.

In drawings, numerals 1 and 2 denote air suspensions mounted in a vehicle, and the air suspensions 1 and 2 are provided between an axle and a vehicle body (both are not illustrated), and configured to adjust a vehicle height according to supply/discharge of air. In the case of a four-wheeled automobile, four air suspensions in total, that is, two at the front wheel side and two at the rear wheel side, are generally disposed. However, in the first exemplary embodiment, in order to simplify the description, only two air suspensions 1 and 2 are illustrated.

Here, in the air suspension 1, an air chamber 1C is formed between a cylinder 1A and a piston rod 1B, and the air chamber 1C is connected to a branch supply/discharge passage 9A to be described below. Meanwhile, in the air suspension 2 as well, an air chamber 2C is formed between a cylinder 2A and a piston rod 2B, and the air chamber 2C is connected to a branch supply/discharge passage 9B to be described below. Here, the cylinders 1A and 2A are hydraulic pressure buffers or the like that damp the vibration of the vehicle. The air suspensions 1 and 2 do not necessarily include the cylinders 1A and 2A, but may be so air spring made of rubber (mere tubular rubber).

A compressor 3 compresses air to be supplied to the air suspensions 1 and 2. Here, the compressor 3 is constituted with a compressor main body 3A and an electric motor 3B that drives the compressor main body 3A. At the suction port 3C side of the compressor 3, an intake filter 4 is provided so as to remove dust or the like in the outside air sucked into the compressor main body 3A. Meanwhile, a replenishment passage 6 to be described below is connected to a discharge port 3D of the compressor 3.

A tank 5 stores air compressed by the compressor 3. The discharge port 3D of the compressor 3 is connected to the tank 5 via the replenishment passage 6, and the compressed air discharged from the compressor 3 is stored in the tank 5 via the replenishment passage 6. Then, the compressed air stored in the tank 5 is supplied to the air chambers 1C and 2C of the air suspensions 1 and 2 via an air supply passage 20 and a supply/discharge passage 9 to be described below. A pressure sensor 42 that measures a pressure in the tank 5 is provided m the tank 5.

An air dryer 7 is provided in the middle of the replenishment passage 6. The air dryer 7 has an inside filled with, for example, a desiccant (not illustrated) such as, for example, a silica gel, and adsorbs moisture included in the compressed air discharged from the compressor 3 by the desiccant, thereby generating dried compressed air. Accordingly, the compressed air dried by passing through the air dryer 7 is stored in the tank 5, and the dried compressed air is also supplied to the air chambers 1C and 2C of the air suspensions 1 and 2.

A first check valve 8 is located between the tank 5 and the air dryer 7 and provided in the middle of the replenishment passage 6. The first check valve 8 allows the flow of air (compressed air) directed from the compressor 3 to the tank 5 and prevents the flow in the opposite direction.

The supply/discharge passage 9 connects the tank 5 to the air chambers 1C and 2C of the air suspensions 1 and 2 via the air supply passage 20 and a supply/discharge switching valve 10 to be described below. In this case, the air supply passage 20 connects the tank 5 to the supply/discharge switching valve 10. Through the supply/discharge passage 9, compressed air to be supplied from the tank 5 to the air suspensions 1 and 2 flows, and air discharged from the air suspensions 1 and 2 flows. Here, the supply/discharge passage 9 is split into two branch supply/discharge passages 9A and 9B in parallel between the supply/discharge switching valve 10 to be described below and the air suspensions 1 and 2, and the branch supply/discharge passages 9A and 9B constitute a part of the supply/discharge passage 9. The branch supply/discharge passage 9A at one side is connected to the air chamber 1C of the air suspension 1, and the branch supply/discharge passage 9B at the other side is connected to the air chamber 2C of the air suspension 2. Accordingly, the respective air suspensions 1 and 2 and respective suspension control valves 11 and 12 to be described below are connected in parallel to the supply/discharge passage 9. In a vehicle in which air suspensions are provided for four wheels, at a junction from which the two branch supply/discharge passages 9A and 9B diverge, branch supply/discharge passages (not illustrated) for other two wheels may further diverge.

The supply/discharge switching valve 10 is provided between the supply/discharge passage 9 and the air supply passage 20, and the supply/discharge switching valve 10 is constituted by a 3-port 2-position solenoid valve. Here, the supply/discharge switching valve 10 selectively switches between a supply position (a) where air (compressed air) is supplied to the air suspensions 1 and 2, and a discharge position (b) where air in the air suspensions 1 and 2 is discharged. Then, the supply/discharge switching valve 10 keeps the discharge position (b) by a spring 10B when, for example, a solenoid 10A is not excited, and switches to the supply position (a) against the spring 10B when the solenoid 10A is excited.

The suspension control valve 11 is located between the air suspension 1 and the supply/discharge switching valve 10 and is provided in the middle of the branch supply/discharge passage 9A. The suspension control valve 11 is constituted by a 2-port 2-position solenoid valve. The suspension control valve 11 controls the extension and retraction of the air suspension 1 by selectively switching between an opening position (a) where the branch supply/discharge passage 9A is opened to allow supply/discharge of air to/from the air chamber 1C of the air suspension 1, and a close position (h) where the branch supply/discharge passage PA is closed to cut off supply/discharge of air to/from the air chamber 1C of the air suspension 1, Here, the suspension control valve 11 keeps the close position (h) where the branch supply/discharge passage 9A is closed by a spring 11B when, for example, a solenoid 11A is not excited, and switches to the opening position (a) where the branch supply/discharge passage 9A is opened against the spring 11B when the solenoid 11A is excited.

The suspension control valve 12 is located between the air suspension 2 and the supply/discharge switching valve 10 and is provided in the middle of the branch supply/discharge passage 9B. The suspension control valve 12 is constituted by a 2-port 2-position solenoid valve like the suspension control valve 11 so as to control the extension and retraction of the air suspension 2 by selectively switching between an opening position (a) where the branch supply/discharge passage 9B is opened and a close position (b) where the branch supply/discharge passage 9B is closed. Here, the suspension control valve 12 keeps the close position (b) where the branch supply/discharge passage 9B is closed by a spring 12B when, for example, a solenoid 12A is not excited, and switches to the opening position (a) where the branch supply/discharge passage 9B is opened against the spring 12B when the solenoid 12A is excited.

In the present exemplary embodiment, since a two-wheeled model is illustrated, an example where the two suspension control valves 11 and 12 are provided is illustrated. In the case of an air suspension for four wheels, a suspension control valve may be provided for each vehicle wheel (a total of four). In addition, one may be provided for left and right sides of each of front and rear wheels. In this case, in order to suppress rolling in the left-right direction of the vehicle, a unit that imparts a flow path resistance, such as an orifice may be provided in a passage communicating between the left and right sides.

A discharge passage 13 connects one port (at the lower side in the drawing) between two ports of the supply/discharge switching valve 10 at the tank 5 side to the suction port 3C of the compressor 3. The discharge passage 13 restores air discharged from the air chambers 1C and 2C of the air suspensions 1 and 2 to a suction side (the suction port 3C side) of the compressor 3 when the supply/discharge switching valve 10 keeps the discharge position (b) and the suspension control valves 11 and 12 switch to the opening positions (a).

A discharge passage open/close valve 14 is provided in the middle of the discharge passage 13. The discharge passage open/close valve 14 is constituted by a 2-port 2-position solenoid valve to open and close the discharge passage 13. Here, the discharge passage open/close valve 14 has an opening position (a) where the discharge passage 13 is opened, and a close position (b) where the discharge passage 13 as closed, and keeps the close position (b) by a spring 14B when, for example, a solenoid 14A is not excited, and switches to the opening position (a) against the spring 14B when the solenoid 14A is excited.

A second check valve 15 is provided at the intake side of the compressor 3. The second check valve 15 is disposed between the suction port 3C of the compressor 3 and the intake filter 4. The second check valve 15 allows the flow of air directed from the intake filter 4 to the compressor 3 and prevents the flow in the opposite direction.

A bypass passage 16 is provided between the replenishment passage 6 and the discharge passage 13. Here, one end side of the bypass passage 16 is connected in the middle of the discharge passage 13, at a connection portion 16A located between the supply/discharge switching valve 10 and the discharge passage open/close valve 14, and the other end side of the bypass passage 16 is connected in the middle of the replenishment passage 6 at a connection portion 16B located between the air dryer 7 and the first check valve 8. Then, the bypass passage 16 is configured to release air within the air chambers 1C and 2C of the air suspensions 1 and 2 to the atmosphere via an atmospheric release passage 18 to be described below by bypassing the compressor 3 while the air dryer 7 is regenerated.

A third check valve 17 is provided in the middle of the bypass passage 16. The third check valve 17 allows the flow of air directed from the discharge passage 13 to the replenishment passage 6 and prevents the flow in the opposite direction.

The atmospheric release passage 18 releases air within the air chambers 1C and 2C of the air suspensions 1 and 2 to the atmosphere. Here, one end side of the atmospheric release passage 18 is connected to the replenishment passage 6, at a connection portion 18A located between the discharge port 3D of the compressor 3 and the air dryer 7. The other end side of the atmospheric release passage 18 is opened to the atmosphere via the intake filter 4. Then, the atmospheric release passage 18 releases air discharged from the air suspensions 1 and 2 to the atmosphere without introducing the air into the tank 5. This is used in the case where the pressure of the tank 5 becomes too high, or the regeneration of the air dryer 7 is necessary.

An atmospheric release valve 19 is provided in the middle of the atmospheric release passage 18. The atmospheric release valve 19 is constituted by a 2-port 2-position solenoid valve, and opens and closes the atmospheric release passage 18. Here, the atmospheric release valve 19 has an opening position (a) where the atmospheric release passage 18 is opened, and a close position (b) where the atmospheric release passage 18 is closed, and keeps the close position (b) by a spring 19B when, for example, a solenoid 19A is not excited, and switches to the opening position (a) against the spring 19B when the solenoid 19A is excited.

An air suspension system according to the first exemplary embodiment has the above described configuration, and an operation thereof will be described below.

First, descriptions will be made on a case where compressed air is not sufficiently stored in the tank 5. In this case, as illustrated in FIG. 1, the compressor 3 is operated while the supply/discharge switching valve 10 is kept at the discharge position (b), and the suspension control valves 11 and 12, the discharge passage open/close valve 14, and the atmospheric release valve 19 are kept at close positions (b), respectively.

Accordingly, the compressor 3 sucks outside air through the intake filter 4, compresses the outside air and discharges the outside air to the replenishment passage 6. The compressed air is dried by the air dryer 7 and stored in the tank 5. Then, when, for example, the pressure within the tank 5 reaches a predetermined pressure, the compressor 3 is stopped and, sufficient compressed air may be filled in the tank 5.

Then, descriptions will be made on a case where a vehicle height a increased, that is, an air supply mode. In this case, in a state where the compressor 3 is stopped, as illustrated in FIG. 2, the discharge passage open/close valve 14 is kept at the close position (b), and the atmospheric release valve 19 is kept at the close position (b) In this state, the solenoid 10A of the supply/discharge switching valve 10 is excited so that the supply/discharge switching valve 10 is switched to the supply position (a), and the solenoids 11A and 12A of the suspension control valves 11 and 12 are excited so that the suspension control valves 11 and 12 are switched to the opening positions (a).

Accordingly, the compressed air within the tank 5 is led to the supply/discharge passage 9, and the compressed air is supplied into the air chamber 1C of the air suspension 1 through the branch supply/discharge passage 9A, and supplied into the air chamber 2C of the air suspension 2 through the branch supply/discharge passage 9B. In this manner, since the compressed air stored in the tank 5 may be supplied into the air chambers 1C and 2C so as to quickly extend the air suspensions 1 and 2, it is possible to quickly increase the vehicle height compared to a case where, for example, the compressed air generated by the compressor 3 is directly supplied into the air chambers 1C and 2C of the air suspensions 1 and 2.

Here, when the pressure within the tank 5 reaches a pressure at which the air suspensions 1 and 2 may not extend to a desired height, the compressor 3 may be driven. However, it is desirable to design the tank 5 with a sufficient capacity so that such a pressure may not be reached.

After an raising operation of the vehicle height as completed, as illustrated in FIG. 1, energization for the solenoid 10A of the supply/discharge switching valve 10 is stopped so that the supply/discharge switching valve 10 is switched to the discharge position (b), and energization for the solenoids 11A and 12A of the suspension control valves 11 and 12 is stopped so that the suspension control valves 11 and 12 are switched to the close positions (b). Accordingly, since the branch supply/discharge passages 9A and 9B are closed, and the air chambers 1C and 2C of the air suspensions 1 and 2 are sealed and thus, it is possible to maintain the air suspensions 1 and 2 at the extended state, and as a result, it is possible to keep the vehicle height at the raised state.

Meanwhile, descriptions will be made on a case where a vehicle height is lowered, that is, a discharge mode. In this case, as illustrated in FIG. 3, while the supply/discharge switching valve 10 is kept at the discharge position (b), the atmospheric release valve 19 is kept at the close position (b). In this state, the solenoid 14A of the discharge passage open/close valve 14 is excited so that the discharge passage open/close valve 14 is switched to the opening position (a), and the solenoids 11A and 12A of the suspension control valves 11 and 12 are excited so that the suspension control valves 11 and 12 are switched to the opening positions (a). Then, the compressor 3 is operated.

Accordingly, the air within the air chamber 1C of the air suspension 1 is led from the branch supply/discharge passage 9A to the discharge passage 13, and the air within the air chamber 2C of the air suspension 2 is led from the branch supply/discharge passage 9B to the discharge passage 13. Then, the air led to the discharge passage 13 is guided to the suction port 3C of the compressor 3 without being released to the atmosphere, compressed by the compressor 3, and supplied into the tank 5 through the replenishment passage 4 and the air dryer 7. As a result, the air is discharged from the air chambers 1C and 2C of the air suspensions 1 and 2, and the air suspensions 1 and 2 are shifted to a retracted state so that it is possible to lower the vehicle height.

In this manner, in the air suspension system according to the first exemplary embodiment, a closed circuit is configured in which the air discharged from the air chambers 1C and 2C of the air suspensions 1 and 2 is compressed by the compressor 3 and is stored in the tank 5 without being released to the atmosphere, and the compressed air stored in the tank 5 is supplied to the air suspensions 1 and 2.

After a lowering operation of the vehicle height is completed, as illustrated m FIG. 1, energization for the solenoids 11A and 12A of the suspension control valves 11 and 12 is stopped so that the suspension control valves 11 and 12 are switched to the close positions (b). Accordingly, since the branch supply/discharge passages 9A and 9B are closed and the air chambers 1C and 2C of the air suspensions 1 and 2 are sealed, the air suspensions 1 and 2 may be maintained at the retracted state so that it is possible to keep the vehicle height at the lowered state.

As described above, the air discharged from the air suspensions 1 and 2 when the vehicle height is lowered is guided to the suction port 3C of the compressor 3 through the discharge passage 13, is compressed by the compressor 3 and is stored in the tank 5. Thus, a tank (a low-pressure tank) configured to store the air discharged from the air suspensions 1 and 2 may become unnecessary.

Accordingly, the air suspension system according to the first exemplary embodiment may be configured using one tank 5 (a high-pressure tank) without providing a low-pressure tank, and the number of components in the entire system may be reduced. As a result, it is possible to reduce the size and weight of the air suspension system as a whole, and to reduce the installation space at the time of mounting on the vehicle. It is possible to improve the assemblability to the vehicle and further to distribute to the reduction of a manufacturing cost. The tank 5 may be divided into a plurality of tanks such as two tanks, four tanks, etc. according to the mountability to the vehicle.

Further, the inside of the air chambers 1C and 2C of the air suspensions 1 and 2 generally has a pressure equal to or greater than an atmospheric pressure, and thus the air discharged from the air suspensions 1 and 2 may be guided to the suction port 3C of the compressor 3 such that a pressure difference between the suction port 3C side and the discharge port 3D side of the compressor 3 may be suppressed. Thus, it is possible to reduce a pressure difference when the air is compressed by the compressor 3 and to reduce a workload of the motor 3B.

In the case where the pressure within the tank 5 is lower than a minimum pressure even when the vehicle height is not lowered, the compressor 3 may be driven in the state of FIG. 1 so that the outside air is sucked into the compressor 3 through the intake filter 4. Accordingly, the compressor 3 compresses the outside air and discharges the outside air to the replenishment passage 6, and the compressed air discharged to the replenishment passage 6 is dried by the air dryer 7, and is stored in the tank 5. In this case, the minimum pressure may be a predetermined constant value, may be set to a low pressure when the vehicle height is high, because the amount of air is small and there is a high possibility of discharge even when air is sucked afterwards, and may be set to a high-pressure when the vehicle height is low because the amount of air is not large and there is a low possibility of discharge even when air is sucked afterwards.

Then, in the case where the vehicle height is rapidly lowered to stabilize a posture during, for example, turning of the vehicle, the supply/discharge switching valve 10 is kept at the discharge position (b), and the discharge passage open/close valve 14 is kept at the close position (b). In this state, the solenoid 19A of the atmospheric release valve 19 is excited so as to switch the atmospheric release valve 19 to the opening position (a), and the solenoids 11A and 12A of the suspension control valves 11 and 12 are excited so as to switch the suspension control valves 11 and 12 to the opening positions (a). Here, the compressor 3 is stopped.

Accordingly, the air within the air chamber 1C of the air suspension 1 is led from the branch supply/discharge passage 9A to the discharge passage 13, and the air within the air chamber 2C of the air suspension 2 is led from the branch supply/discharge passage 9B to the discharge passage 13. Then, the air led to the discharge passage 13 is guided to the atmospheric release passage 18 via the air dryer 7 through the bypass passage 16, and is released to the atmosphere from the atmospheric release passage 18. This case corresponds to an atmospheric discharge mode. As a result, the air may be rapidly discharged from the air chambers 1C and 2C of the air suspensions 1 and 2, and the vehicle height may be rapidly lowered.

Meanwhile, when the vehicle height is rapidly lowered, the air discharged from the air suspensions 1 and 2 flows from the bypass passage 16 to the atmospheric release passage 18 through the air dryer 7. Accordingly, moisture may be removed from the desiccant filled in the air dryer 7 and the desiccant may be regenerated.

Accordingly, the air suspension system according to the first exemplary embodiment is configured such that the compressed air stored m advance in the tank 5 is supplied to the air chambers 1C and 2C of the air suspensions 1 and 2 through the supply/discharge passage 9 when the vehicle height is increased by the air suspensions 1 and 2. Accordingly, it is possible to quickly supply the compressed air and to quickly increase the vehicle height as compared to a case where, for example, the air compressed by the compressor 3 is directly supplied to the air suspensions 1 and 2.

When the vehicle height is lowered by the air suspensions 1 and 2, a configuration is employed in which in general, the air within the air chambers 1C and 2C of the air suspensions 1 and 2 is guided to the suction port 3C of the compressor 3 through the discharge passage 13 without being released to the atmosphere, is compressed by the compressor 3, and is supplied into the tank 5 through the replenishment passage 6 and the air dryer 7. Accordingly, a tank (a low-pressure tank) configured to store the air discharged from the air suspensions 1 and 2 once at a low pressure may become unnecessary.

Thus, the air suspension system according to the first exemplary embodiment may be configured using one tank 5 (a plurality of tanks may be used according to the mountability), and the number of components in the entire system may be reduced. As a result, it is possible to reduce the size and weight of the air suspension system as a whole, and to reduce the installation space at the time of mounting on the vehicle. It is possible to improve the assemblability to the vehicle and further to distribute to the reduction of a manufacturing cost.

When the tank pressure is low due to a decrease of a temperature or the like, the compressor 3 may suck the outside air through the intake filter 4, compress the outside air and store the outside air in the tank 5. Accordingly, it is possible to always store a required compressed air in the tank 5, and to cope with the adjustment of the vehicle height by the air suspensions 1 and 2.

When the air is discharged from the air suspensions 1 and 2, in the case where the discharge passage open/close valve 14 is switched to the close position (b), the air led from the air suspensions 1 and 2 to the discharge passage 13 may be guided from the bypass passage 16 to the atmospheric release passage 18 via the air dryer 7, and may be released from the atmospheric release passage 18 to the atmosphere.

As a result, it is possible to rapidly lower the vehicle height by rapidly discharging the air from the air chambers 1C and 2C of the air suspensions 1 and 2 to as to retract the air suspensions 1 and 2. The air discharged from the air suspensions 1 and 2 may flow from the bypass passage 16 to the atmospheric release passage 18 through the air dryer 7 so as to remove moisture from the desiccant filled within the air dryer 7 and regenerating the desiccant. Since the compressor 3 starts at the time of discharge, here, the pressure of the compressor 3 at the discharge side, that is, the pressure of the tank 5, is in a low state, and the pressure at the suction side, that is, the pressure of the air chambers 1C and 2C of the air suspensions 1 and 2, is in a high state (but lower than the pressure of the tank 5). Thus, since a differential pressure is low, the compressor 3 may start easily.

Here, in the first exemplary embodiment, the supply/discharge switching valve 10, the suspension control valves 11 and 12, the discharge passage open/close valve 14, and the third check valve 17 constitute a valve mechanism between the tank and the air suspension in the present invention, which may switch connection/disconnection between the tank and the air suspension, and switch connection/disconnection between the air suspension and the intake side of the compressor. The suspension control valves 11 and 12 are control valves that switch possibility/impossibility of supply/discharge of each air suspension.

Hereinafter, a modification (a first modification) of the first exemplary embodiment will be described with reference to FIG. 4.

Figure 4:
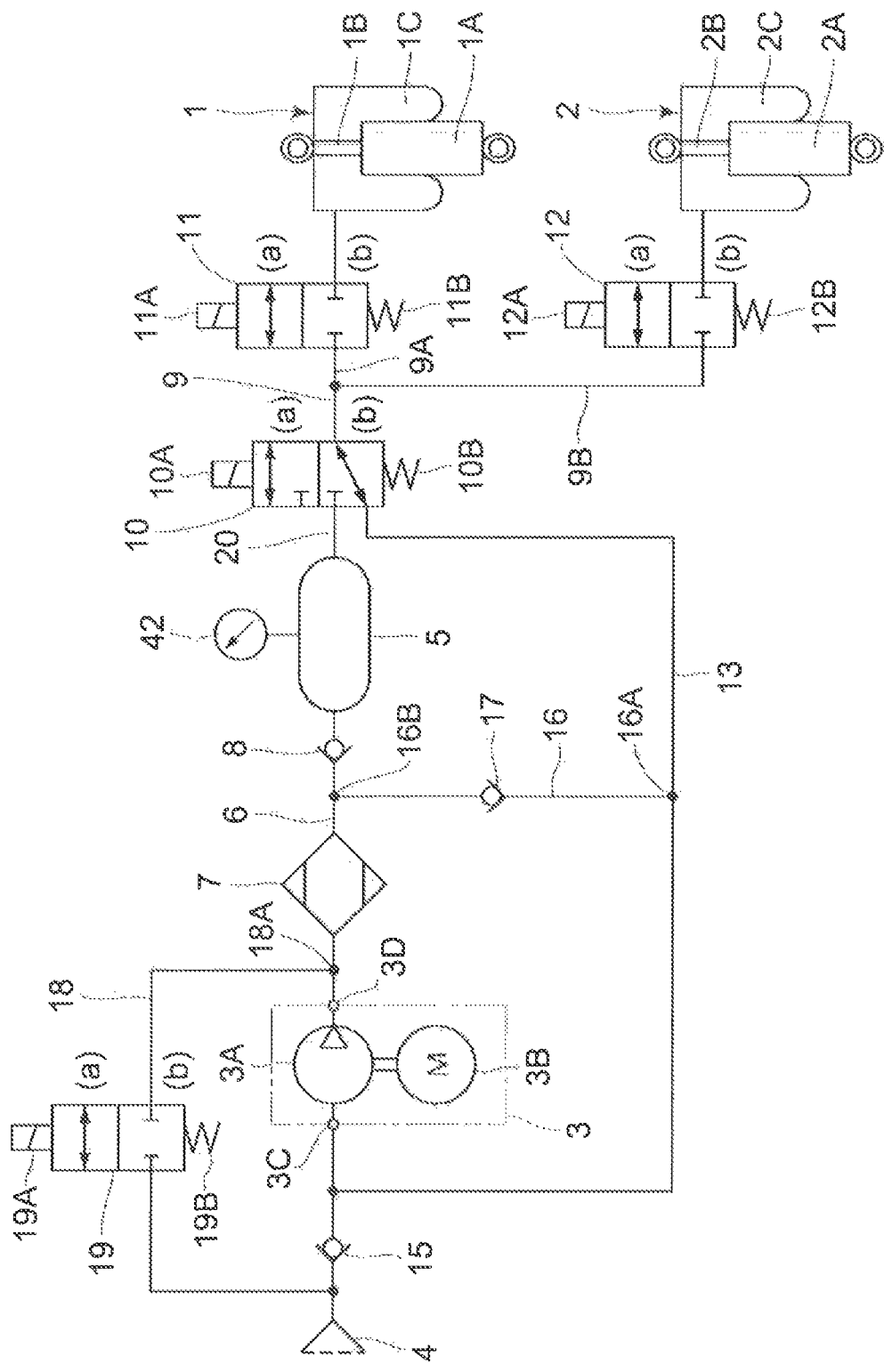
FIG. 4 is a circuit diagram illustrating an air suspension system according to a first modification.

In a system in the first modification illustrated in FIG. 4, the discharge passage 13 is always connected to the intake side of the compressor 3 without using the discharge passage open/close valve 14. In the case of this configuration, when the vehicle height is lowered by the air suspensions 1 and 2, the air within the air chambers 1C and 2C of the air suspensions 1 and 2 is guided to the suction port 3C of the compressor 3 through the discharge passage 13 without being released to the atmosphere, is compressed by the compressor 3, and is supplied into the tank 5 through the replenishment passage 6 and the air dryer 7. By switching the atmospheric release valve 19 to the opening position (a), the air led from the air suspensions 1 and 2 to the discharge passage 13 may be guided to the atmospheric release passage 18 from the bypass passage 16 via the air dryer 7, and released to the atmosphere from the atmospheric release passage 18. In this manner, even in a configuration where the discharge passage 13 is always connected to the replenishment passage 6 without using the discharge passage open/close valve 14, the same effect as that in the above described first exemplary embodiment may be achieved. However, as illustrated in the first exemplary embodiment, when the discharge passage open/close valve 14 is used, both the pressure and flow rate of air passing through the air dryer 7 may be increased because in the case where a certain type of compressor allowing a flow at the time of stop is used as the compressor 3, the air is not discharged via the compressor unless passing through the dryer at the time of discharge for atmospheric release. Thus, as compared to the modification in the first exemplary embodiment, the desiccant filled in the air dryer 7 may be quickly regenerated.

In the above described exemplary embodiment, a case where the supply/discharge switching valve 10, the suspension control valves 11 and 12, the discharge passage open/close valve 14, and the atmospheric release valve 19 are constituted by electromagnetic pilot-type direction control valves, respectively, is exemplified. However, the present invention is not limited thereto, but, for example, a pneumatic pilot type or hydraulic pilot type of direction control valve may be used.

Hereinafter, the invention included in the exemplary embodiment as described above will be described. That is, according to the present invention, the air suspension system is configured by an air suspension, a compressor, a tank, a replenishment passage connecting the compressor to the tank, a first check valve provided m the middle of the replenishment passage, a supply/discharge passage connecting the tank to the air suspension, a supply/discharge switching valve provided in the middle of the supply/discharge passage, a suspension control valve located between the supply/discharge switching valve and the air suspension and provided in the supply/discharge passage, a return passage connecting the supply/discharge switching valve to the suction side of the compressor, and a return passage open/close valve provided in the middle of the return passage. In the configuration, when the vehicle height is lowered by the air suspension, the supply/discharge switching valve is switched to a discharge position, the supply/discharge passage is opened by the suspension control valve, the return passage is opened by the return passage open/close valve, and the compressor is operated such that the air within the air suspension is supplied into the tank through the return passage and the replenishment passage without being released to the atmosphere. Accordingly, the air discharged from the air suspension may be introduced to the compressor and compressed by the compressor to be stored in the tank. Accordingly, the air suspension system may be configured using one tank, and thus it is possible to reduce the size and weight of the air suspension system as a whole, and to reduce the installation space at the time of mounting on the vehicle.

According to the present invention, when the vehicle height is increased by the air suspension, the supply/discharge switching valve is switched to a supply position and the supply/discharge passage is opened by the suspension control valve such that the compressed air in the tank may be supplied to the air suspension through the supply/discharge passage.

According to the present invention, a second check valve which allows the flow of air directed to the compressor and prevents the flow in the opposite direction is provided at the intake side of the compressor. Thus, when the pressure within the return passage is lower than the atmospheric pressure, the compressor may compress the outside air socked through the intake filter and supply the outside air to the tank through the replenishment passage.

According to the present invention, a configuration is employed in which an air dryer is located between the compressor and the first check valve and is provided in the middle of the replenishment passage, a bypass passage having one end side connected to the return passage between the supply/discharge switching valve and the return passage open/close valve and the other end side connected to the replenishment passage between the air dryer and the first check valve is provided, a third check valve is provided in the middle of the bypass passage, a discharge passage having one end side connected to the replenishment passage between the discharge side of the compressor and the air dryer and the other end side opened to the atmosphere is provided, and a discharge passage open/close valve is provided in the middle of the discharge passage. Accordingly, it is possible to rapidly lower the vehicle height by discharging the air within the air suspension to the atmosphere. The air discharged from the air suspension may flow from the bypass passage to the discharge passage through the air dryer, thereby removing moisture from the desiccant filled in the air dryer, so that the desiccant can be regenerated.

Figure 5:
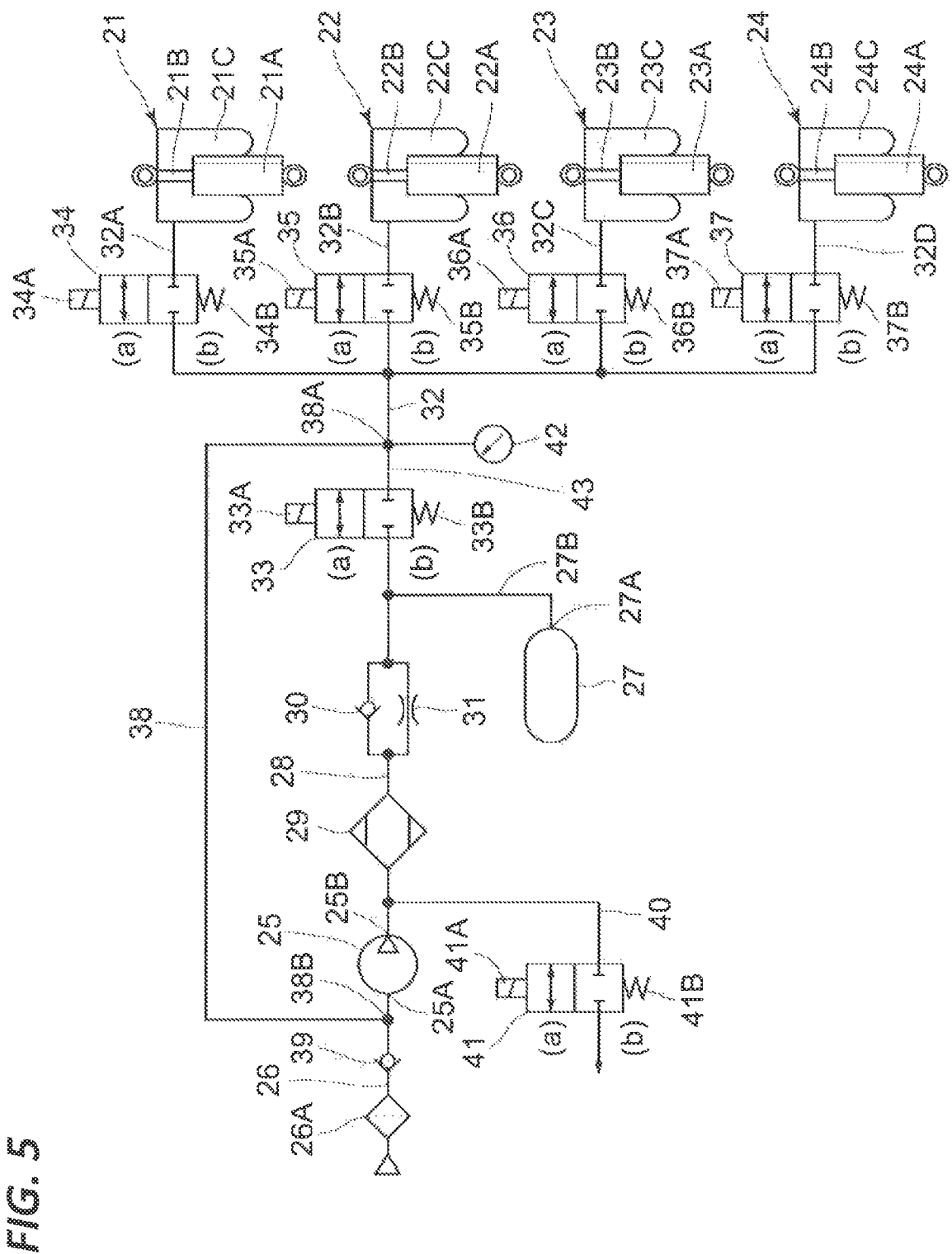
FIG. 5 is a circuit diagram illustrating an air suspension system according to a second exemplary embodiment.
Figure 6:
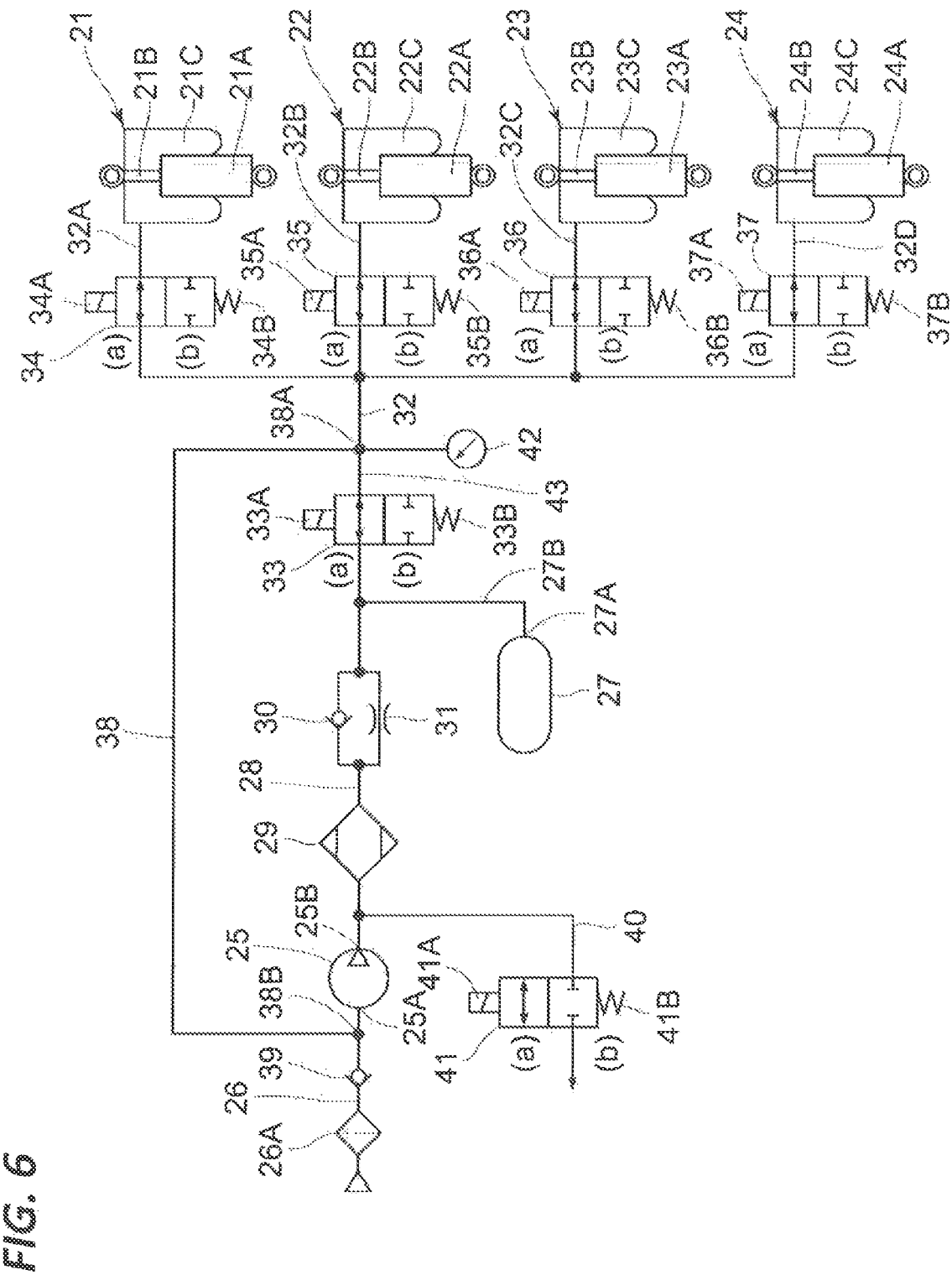
FIG. 6 is a circuit diagram illustrating a state where a vehicle height is raised by air suspensions.
Figure 7:
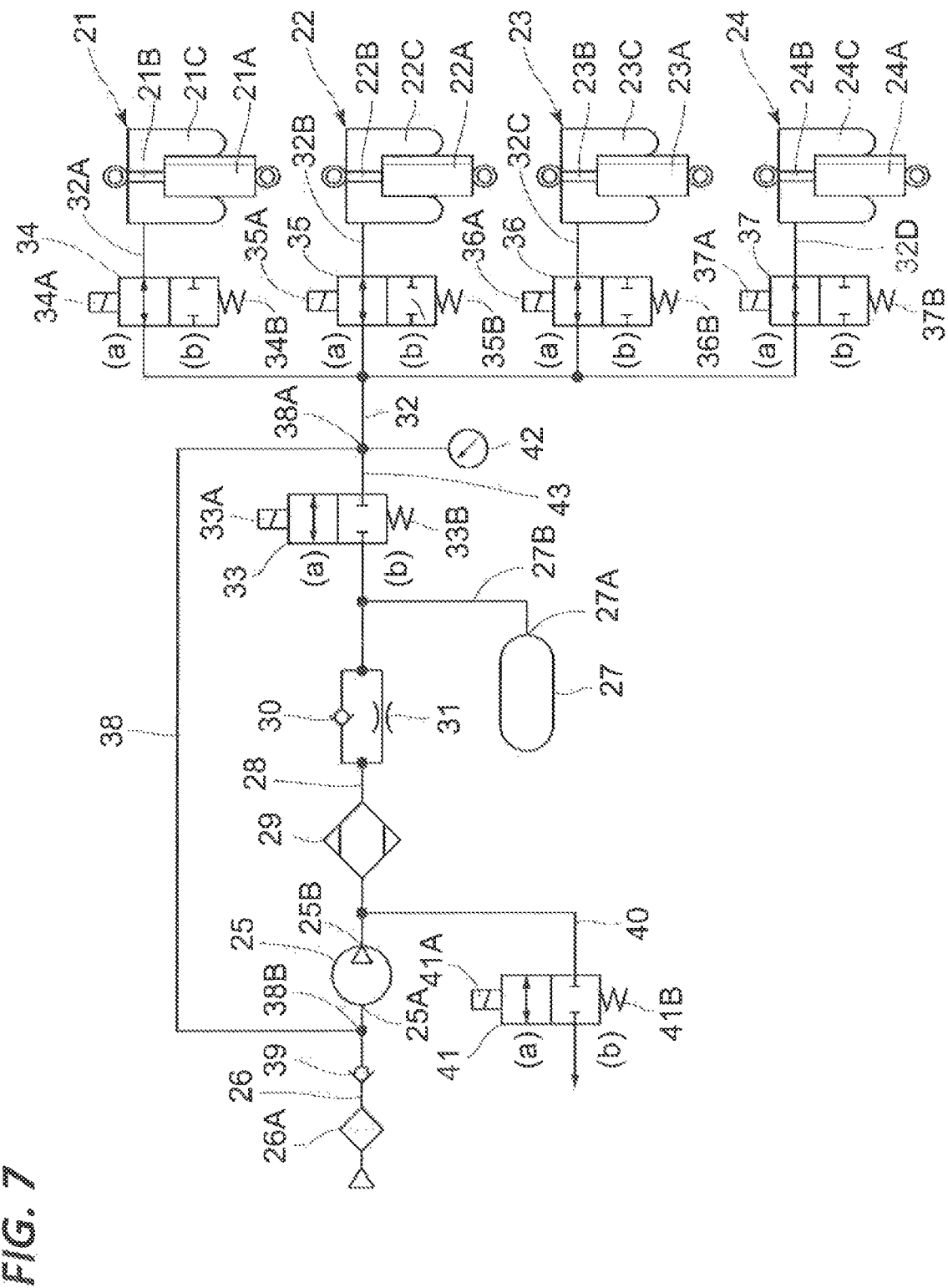
FIG. 7 is a circuit diagram illustrating a state where a vehicle height is lowered by air suspensions.

Hereinafter. FIGS. 5 to 7 illustrate an air suspension system according to a second exemplary embodiment.

In drawings, numerals 21, 22, 23, and 24 denote air suspensions interposed between an axle and a vehicle body (both are not illustrated) of a vehicle. The air suspension 21 is provided at a left front wheel side FL of the vehicle, and the air suspension 22 is provided at a right front wheel side FR of the vehicle. The air suspension 23 is provided at a left rear wheel side RL of the vehicle, and the air suspension 24 is provided at a right rear wheel side RR of the vehicle.

Here, in the air suspension 21, an air chamber 21C is formed between a cylinder 21A such as a hydraulic pressure buffer and a piston rod 21B, and the air chamber 21C is connected to a branch supply/discharge passage 32A to be described below. Similarly, the air suspension 22 has a cylinder 22A, a piston rod 22B, an air chamber 22C, and the air chamber 22C is connected to a branch supply/discharge passage 32B to be described below. The air suspension 23 has a cylinder 23A, a piston rod 23B, and an air chamber 23C, and the air chamber 23C is connected to a branch supply/discharge passage 32C to be described below. The air suspension 24 has a cylinder 24A, a piston rod 24B, and an air chamber 24C, and the air chamber 24C is connected to a branch supply/discharge passage 32D to be described below. These air suspensions 21 to 24 are vertically extended and retracted when air is supplied to or discharged from the air chambers 21C to 24C, so that a vehicle height for each vehicle wheel is increased or lowered.

A compressor 25 compresses air to be supplied to the air suspensions 21 to 24. Here, at a suction port 25A of the compressor 25, one end side of an atmosphere introduction passage 26 is connected, and at the other end side of the atmosphere introduction passage 26, an intake filter 26A is provided to remove dust or the like in the atmospheric air sucked into the compressor 25. Meanwhile, a replenishment passage 28 to be described below is connected to a discharge port 25B of the compressor 25.

A tank 27 stores air compressed by the compressor 25. The tank 27 includes one inflow/outflow port 27A serving as an inflow port and an outflow port of air, and is connected to the replenishment passage 28 and an air supply passage 43 to be described below via a branch passage 27B connected to the inflow/outflow port 27A.

The replenishment passage 28 connects the compressor 25 to the tank 27. In this case, the branch passage 27B of the tank 27 constitutes a pan of the replenishment passage 28. The discharge port 25B of the compressor 25 is connected to the tank 27 via the replenishment passage 28 including the branch passage 27B. The tank 27 is connected to each of the air suspensions 21 to 24 via the branch passage 27B, the air supply passage 43, and a supply/discharge passage 32. Accordingly, compressed air discharged from the compressor 25 is stored in the tank 27 through the replenishment passage 28, and the compressed air stored in the tank 27 is supplied to the air chambers 21C to 24C of the air suspensions 21 to 24 through the air supply passage 43, and the supply/discharge passage 32.

An air dryer 29 is provided in the middle of the replenishment passage 28. The air dryer 29 has an inside filled with, for example, a desiccant (not illustrated) such as a silica gel, and adsorbs moisture included in compressed air discharged from the compressor 25 by the desiccant, thereby generating dried compressed air. Accordingly, the compressed air dried by passing through the air dryer 29 is stored in the tank 27, and the dried compressed air is also supplied to the air chambers 21C to 24C of the air suspensions 21 to 24.

A check valve 30 and an orifice 31 are located between the tank 27 and the air dryer 29 and provided in parallel in the middle of the replenishment passage 28. The check valve 30 allows the flow of air directed from the compressor 25 to the tank 27 and prevents the flow in the opposite direction. Meanwhile, the orifice 31 squeezes the flow of air between the tank 27 and the air dryer 29 while always allowing the flow of air.

The supply/discharge passage 32 connects the tank 27 to the air chambers 21C, 22C, 23C, and 24C of the air suspensions 21, 22, 23, and 24 via the air supply passage 43 and an air supply valve 33. In this case, the supply/discharge passage 32 and the air supply passage 43 are separated from each other at a portion at which one end 38A of a discharge passage 38 to be described below is connected, in which the side of the tank 27 across one end 38A of the discharge passage 38 becomes the air supply passage 43, and the side of each of the air suspensions 21 to 24 becomes the supply/discharge passage 32.

Here, the supply/discharge passage 32 is split into the four branch supply/discharge passages 32A, 32B. 32C, and 32D in parallel between the air supply valve 33 to be described below and the air suspensions 21, 22, 23, and 24, and the four branch supply/discharge passages 32A, 32B, 32C, and 32D constitute a part of the supply/discharge passage 32. The branch supply/discharge passage 32A is connected to the air chamber 21C of the air suspension 21, the branch supply/discharge passage 32B is connected to the air chamber 22C of the air suspension 22, the branch supply/discharge passage 32C is connected to the air chamber 23C of the air suspension 23, and the branch supply/discharge passage 32D is connected to the air chamber 24C of the air suspension 24. Accordingly, the respective air suspensions 21 to 24 and respective suspension control valves 34 to 37 to be described below are connected in parallel to the supply/discharge passage 32.

The air supply valve 33 is provided in the middle of the air supply passage 43 to open and close the air supply passage 43. Here, the air supply valve 33 is constituted by a 2-port 2-position solenoid valve, and selectively switches between a valve opening position (a) where the air supply passage 43 is opened so that air is supplied from the tank 27 to the respective branch supply/discharge passages 32A to 32D, and a valve close position (b) where the air supply passage 43 is closed so that air is cut off from being supplied to the respective branch supply/discharge passages 32A to 32D. The air supply valve 33 keeps the valve close position (b) by a spring 338 when, for example, a solenoid 33A is not excited and switches to the valve opening position (a) when the solenoid 33A is excited.

The suspension control valve 34 is located between the air suspension 21 and the air supply valve 33 and is provided in the middle of the branch supply/discharge passage 32A, and the suspension control valve 35 is located between the air suspension 22 and the air supply valve 33 and is provided in the middle of the branch supply/discharge passage 32B. The suspension control valve 36 is located between the air suspension 23 and the air supply valve 33 and is provided in the middle of the branch supply/discharge passage 32C, and the suspension control valve 37 is located between the air suspension 24 and the air supply valve 33 and is provided in the middle of the branch supply/discharge passage 32D. That is, the respective suspension control valves 34 to 37 are connected in parallel to the supply/discharge passage 32.

Here, the suspension control valve 34 is constituted by a 2-port 2-position solenoid valve, and switches between a valve opening position (a) where the branch supply/discharge passage 32A is opened and supply/discharge of air to/from the air chamber 21C of the air suspension 21 is allowed, and a valve close position (b) where the branch supply/discharge passage 32A is closed and supply/discharge of air to/from the air chamber 21C of the air suspension 21 is cut off. The suspension control valve 34 keeps the valve close position (b) by a spring 34B when, for example, a solenoid 34A is not excited, and switches to the valve opening position (a) when the solenoid 34A is excited.

As in the suspension control valve 34, each of the suspension control valves 35, 36, and 37 is also constituted by a 2-port 2-position solenoid valve, and switches between a valve opening position (a) where each of the branch supply/discharge passages 32B, 32C, and 32D is opened and supply/discharge of air to/from each of the air chambers 22C, 23C, and 24C in each of the air suspensions 22, 23, and 24 is allowed, and a valve close position (b) where each of the branch supply/discharge passages 32B, 32C, and 32D is closed and supply/discharge of air to/from each of the air chambers 22C, 23C, and 24C in each of the air suspensions 22, 23, and 24 is cut off. The suspension control valves 35, 36, and 37 keep the valve close positions (b) by springs 35B, 36B, and 37B when solenoids 35A, 36A, and 37A are not excited, and switch to the valve opening positions (a) when the solenoids 35A, 36A, and 37A are excited.

The discharge passage 38 connects the supply/discharge passage 32 to the atmosphere introduction passage 26. That is, the one end 38A of the discharge passage 38 is connected to a junction of the air supply passage 43 and the supply/discharge passage 32, and the other end 38B of the discharge passage 38 is connected between the suction port 25A of the compressor 25 and a second check valve 39 to be described below in the atmosphere introduction passage 26. When the air supply valve 33 is kept at the valve close position (b) and the suspension control valves 34 to 37 are switched to the valve opening, positions (a), the discharge passage 38 guides air discharged from the air chambers 21C to 24C of the air suspensions 21 to 24 to the intake side (the suction port 25A side) of the compressor 25.

The second check valve 39 is located between the other end 38B of the discharge passage 38 and the intake filter 26A and is provided in the middle of the atmosphere introduction passage 26. The second check valve 39 allows the flow of air directed to the compressor 25 through the atmosphere introduction passage 26 and prevents the flow in the opposite direction.

An atmospheric release passage 40 is connected to a portion located between the compressor 25 and the air dryer 29 in the middle of the replenishment passage 28, and an atmospheric release valve 41 is provided in the middle of the atmospheric release passage 40.

The atmospheric release valve 41 is constituted by a 2-port 2-position solenoid valve, and switches to a valve opening position (a) where the atmospheric release passage 40 is opened so that air flowing through the replenishment passage 28 is released to the atmosphere, and a valve close position (b) where the atmospheric release passage 40 is closed. The atmospheric release valve 41 keeps the valve close position (b) by a spring 41B when, for example, a solenoid 41A is not excited, and switches to the valve opening position (a) when the solenoid 41A is excited.

The pressure sensor 42 is located between the air supply valve 33 and the respective suspension control valves 34 to 37 and s provided at a contact point between the air supply passage 43 and the supply/discharge passage 32. The pressure sensor 42 detects a pressure of air (compressed air) to be supplied from the tank 27 to the supply/discharge passage 32. Depending on situations, the air supply valve 33 or any one of the suspension control valves 34 to 37 may be opened so that the pressure within the tank 27 or the pressure within the air suspensions 21 to 24 may be detected. For example, when the air supply valve 33 is switched to the valve opening position (a), air is supplied from the tank 27 to the air supply passage 43 so that the pressure of the air supply passage 43 becomes the same as the pressure of the tank 27. Thus, the pressure of the tank 27 may be detected. When the suspension control valves 34 to 37 are switched to the valve opening positions, air us supplied from the air suspensions 21 to 24 to the air supply passage 43 (or the discharge passage 38) so that the pressure of the air supply passage 43 becomes the same as the pressure of the air suspensions 21 to 24. Thus, the pressure of the air suspensions 21 to 24 may be detected.

An air suspension system according to the second exemplary embodiment has the above described configuration, and an operation thereof will be described below.

First, in the case where filling (pressure accumulation) of compressed air in the tank 27 is required at the time of, for example, the factory shipment of a vehicle, the compressor 25 is operated in a state where the air supply valve 33, the suspension control valves 34 to 37, and the atmospheric release valve 41 are kept at the valve close positions (b), respectively.

Accordingly, the compressor 25 sucks the atmosphere (outside air) through the atmosphere introduction passage 26 and the intake filter 26A, compresses the outside air and discharges the outside air to the replenishment passage 28. The compressed air is dried by the air dryer 29 and is stored in the tank 27. Then, when, for example, the pressure within the tank 27 reaches a predetermined pressure, the compressor 25 is stopped and, dried compressed air may be filled in the tank 27.

Then, in the case where the vehicle height is increased by the respective air suspensions 21 to 24 (an air supply mode), in a state where the compressor 25 is stopped, as illustrated in FIG. 6, the solenoid 33A of the air supply valve 33, and the respective solenoids 34A to 37A of the suspension control valves 34 to 37 are excited so that the air supply valve 33 is switched to the valve opening position (a), and the respective suspension control valves 34 to 37 are switched to the valve opening positions (a).

Accordingly, the compressed air within the tank 27 is led to the supply/discharge passage 32, and the compressed air is supplied into the air chamber 21C of the air suspension 21 through the branch supply/discharge passage 32A, supplied into the air chamber 22C of the air suspension 22 through the branch supply/discharge passage 32B, supplied into the air chamber 23C of the air suspension 23 through the branch supply/discharge passage 32C, and supplied into the air chamber 24C of the air suspension 24 through the branch supply/discharge passage 32D. In this manner, since it is possible to quickly extend the air suspensions 21 to 24 by supplying the compressed air stored in the tank 27 into the air chambers 21C to 24C, the vehicle height is capable of quickly increasing compared to a case where, for example, the compressed air generated by the compressor 25 is directly supplied into the air chambers 21C to 24C of the air suspensions 21 to 24.

After a raising operation of the vehicle height is completed, energization for the solenoid 33A of the air supply valve 33, and the respective solenoids 34A to 37A of the suspension control valves 34 to 37 is stopped so that the air supply valve 33 and the respective suspension control valves 34 to 37 are switched to the valve close positions (b). Accordingly, since the branch supply/discharge passages 32A to 32D are closed and the air chambers 21C to 24C of the air suspensions 21 to 24 are sealed, it is possible to maintain the air suspensions 21 to 24 at the extended state, and as a result, it is possible to keep the vehicle height at the raised state.

Meanwhile, in the case where the vehicle height is lowered (a discharge mode), as illustrated in FIG. 7, the respective solenoids 34A to 37A of the suspension control valves 34 to 37 are excited so that the respective suspension control valves 34 to 37 are switched to the valve opening positions (a). Then, in a state where the air supply valve 33 is kept at the valve close position (b), the compressor 25 is operated.

Accordingly, the air within the air chamber 21C of the air suspension 21 is led from the branch supply/discharge passage 32A to the discharge passage 38, the air within the air chamber 22C of the air suspension 22 is led from the branch supply/discharge passage 32B to the discharge passage 38, the air within the air chamber 23C of the air suspension 23 is led from the branch supply/discharge passage 32C to the discharge passage 38, and the air within the air chamber 24C of the air suspension 24 is led from the branch supply/discharge passage 32D to the discharge passage 38. Then, the air led to the discharge passage 38 is guided to the suction port 25A of the compressor 25 via the atmosphere introduction passage 26 without being released to the atmosphere, compressed by the compressor 25, and supplied into the tank 27 through the replenishment passage 28, the air dryer 29, and the check valve 30. As a result, the air is discharged from the air chambers 21C to 24C of the air suspensions 21 to 24 and the air suspensions 21 to 24 are shifted to a retracted state so that it is possible to lower the vehicle height.

After a lowering operation of the vehicle height is completed, energization for the solenoids 34A to 37A of the suspension control valves 34 to 37 is stopped so that the suspension control valves 34 to 37 are switched to the valve close positions (b). Accordingly, since the respective branch supply/discharge passages 32A to 32D are closed and the air chambers 21C to 24C of the air suspensions 21 to 24 are sealed, it is possible to the air suspensions 21 to 24 at the retracted state, and as a result, it is possible to keep the vehicle height at the lowered state.

As described above, the air discharged from the air suspensions 21 to 24 when the vehicle height is lowered is guided to the suction port 25A of the compressor 25 through the discharge passage 38, is compressed by the compressor 25 and is stored in the tank 27. Thus, a tank (a low-pressure tank) configured to store the air discharged from the air suspensions 21 to 24 may become unnecessary. That is, in the air suspension system according to the present exemplary embodiment, a closed circuit is configured in which the air discharged from the air chambers 21C to 24C of the air suspensions 21 to 24 is compressed by the compressor 25 and is stored m the tank 27 without being released to the atmosphere, and the compressed air stored in the tank 27 is supplied to the air suspensions 21 to 24.

Thus, the air suspension system according to the second exemplary embodiment may be configured using one tank 27 (a plurality of tanks may be used according to the mountability), and the number of components in the entire system may be reduced. Further, the inside of each of the air chambers 21C to 24C of the air suspensions 21 to 24 generally has a pressure equal to or greater than an atmospheric pressure, and thus the air discharged from the air suspensions 21 to 24 may be guided to the suction port 25A of the compressor 25 such that a pressure difference between the suction port 25A side and the discharge port 25B side of the compressor 25 may be suppressed. It is possible to reduce a pressure when the air is compressed by the compressor 25.

Meanwhile, when the pressure inside the air chambers 21C to 24C of the air suspensions 21 to 24 is lower than the atmospheric pressure, the outside air is sucked into the compressor 25 through the atmosphere introduction passage 26. Accordingly, the compressor 25 compresses the outside air and discharges the outside air to the replenishment passage 28, and the compressed air discharged to the replenishment passage 28 is dried by the air dryer 29 and stored in the tank 27. Here, both the air supply valve 33 and the suspension control valve 34 are valve-opened.

Then, when the pressure within the tank 27 exceeds a specified pressure due to, for example, an increase of an outside temperature or the like, the air supply valve 33 is kept at the valve close position (b), and the solenoid 41A of the atmospheric release valve 41 is excited so that the atmospheric release valve 41 is switched to the valve opening position (a). Accordingly, the air within the tank 27 may be released to the atmosphere through the replenishment passage 28, the orifice 31, the air dryer 29, and the atmospheric release passage 40 so that the pressure within the tank 27 may be lowered (an atmospheric discharge mode). Here, the air within the tank 27 may pass through the air dryer 29, thereby removing moisture from the desiccant filled within the air dryer 29 and regenerating the desiccant.

Accordingly, the air suspension system according to the second exemplary embodiment is configured such that the compressed air stored in advance in the tank 27 is supplied to the air chambers 21C to 24C of the air suspensions 21 to 24 through the supply/discharge passage 32 when the vehicle height is increased by the air suspensions 21 to 24 (an air supply mode). Accordingly, it is possible to quickly supply the compressed air and to quickly increase the vehicle height as compared to a case where, for example, the air compressed by the compressor 25 is directly supplied to the air suspensions 21 to 24.

When the vehicle height is lowered by the air suspensions 21 to 24 (a discharge mode), a configuration is employed in which the air within the air chambers 21C to 24C of the air suspensions 21 to 24 is guided to the suction port 25A of the compressor 25 through a part of the supply/discharge passage 32 (each of branch supply/discharge passages 32A to 32D) and the discharge passage 38 without being released to the atmosphere, is compressed by the compressor 25, and is supplied into the tank 27 through the replenishment passage 28 and the air dryer 29. Accordingly, a tank (a low-pressure tank) configured to store the air discharged from the air suspensions 21 to 24 may become unnecessary.

Thus, the air suspension system according to the second exemplary embodiment may be configured using one tank 27, and the number of components in the entire system may be reduced. As a result, it is possible to reduce the size and weight of the air suspension system as a whole, and to reduce the installation space at the time of mounting on the vehicle. It is possible to improve the assemblability to the vehicle and further to distribute to the reduction of a manufacturing cost.

Meanwhile, the air suspension system according to the second exemplary embodiment has a configuration in which only one air supply valve 33 including the solenoid valve is provided in the middle of the supply/discharge passage 32 that guides the compressed air from the tank 27 to the respective air chambers 21C to 24C of the air suspensions 21 to 24. As a result, when the air is supplied to or discharged from the respective air chambers 21C to 24C of the air suspensions 21 to 24, it is possible to reduce a pipe resistance when the air passes through the solenoid valve, and to increase the adjustment speed of the vehicle height by each of the air suspensions 21 to 24.

Further, in the air suspension system according to the second exemplary embodiment, the number of solenoid valves used for the entire system may be suppressed to six in total, with the air supply valve 33, the atmospheric release valve 41, and the four suspension control valves 34 to 37. As a result, it is possible to further reduce the number of components constituting the air suspension system, thereby simplifying the entire system. It is possible to reduce consumption of power consumed for driving each solenoid valve.

The air suspension system according to the second exemplary embodiment has a configuration in which the air dryer 29 is provided between the compressor 25 and the tank 27 in the middle of the replenishment passage 28, the check valve 30 allowing the flow of air directed from the compressor 25 to the tank 27 and prevents the flow in the opposite direction, and the orifice 31 always allowing the flow of air between the tank 27 and the air dryer 29 are disposed in parallel between the air dryer 29 and the tank 27, and the atmospheric release valve 41 capable of releasing the air within the replenishment passage 28 to the atmosphere is provided between the compressor 25 and the air dryer 29.

Accordingly; when the pressure within the tank 27 exceeds a specified pressure, the atmospheric release, valve 41 is switched to the valve opening position (a) so that the air within the tank 27 may be released to the atmosphere through the replenishment passage 28, the orifice 31, the air dryer 29, and the atmospheric release passage 40, and the pressure within the tank 27 may be reduced. Here, the air within the tank 27 may pass through the air dryer 29 so as to remove moisture from the desiccant filled within the air dryer 29 and regenerating the desiccant. In the second exemplary embodiment, the air supply valve 33 may be omitted.

The air supply valve 33 and the respective suspension control valves 34 to 37 constitute a valve mechanism of the present invention, and the respective suspension control valves 34 to 37 correspond to control valves.

Figure 8:
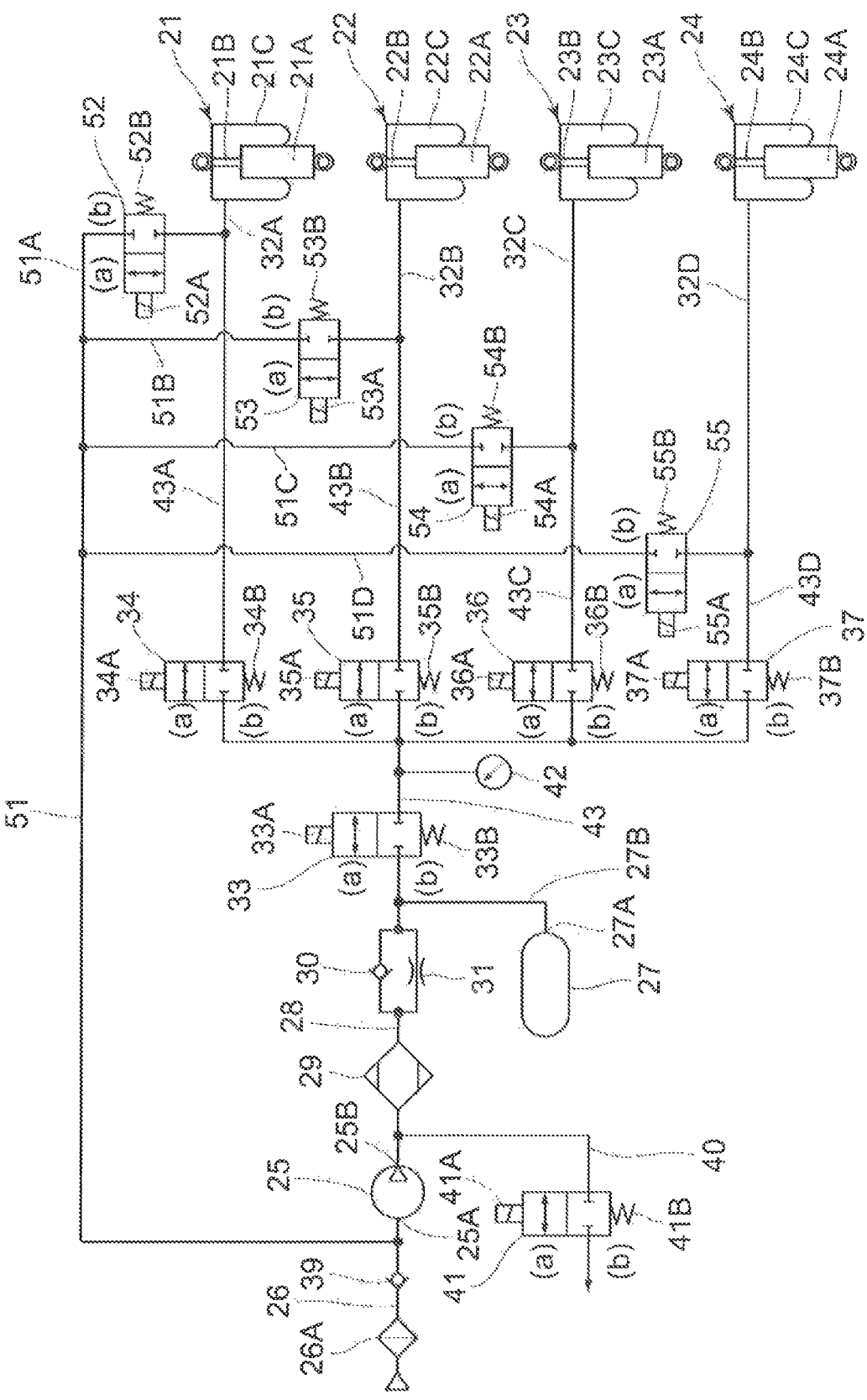
FIG. 8 is a circuit diagram illustrating an air suspension system according to a third exemplary embodiment.
Figure 9:
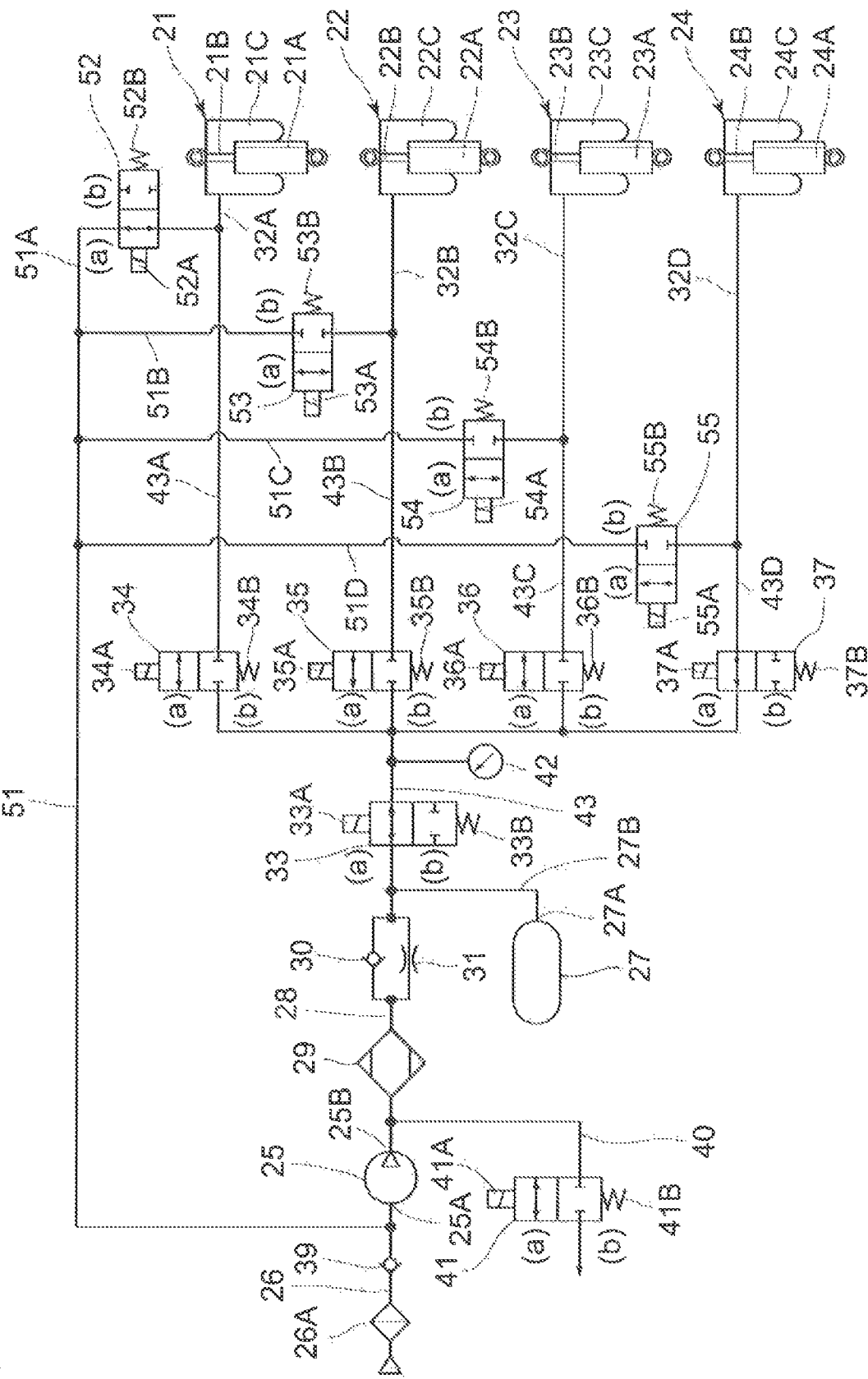
FIG. 9 is a circuit diagram illustrating a state where a left front-side vehicle height of a vehicle as lowered by air suspensions.
Figure 10:
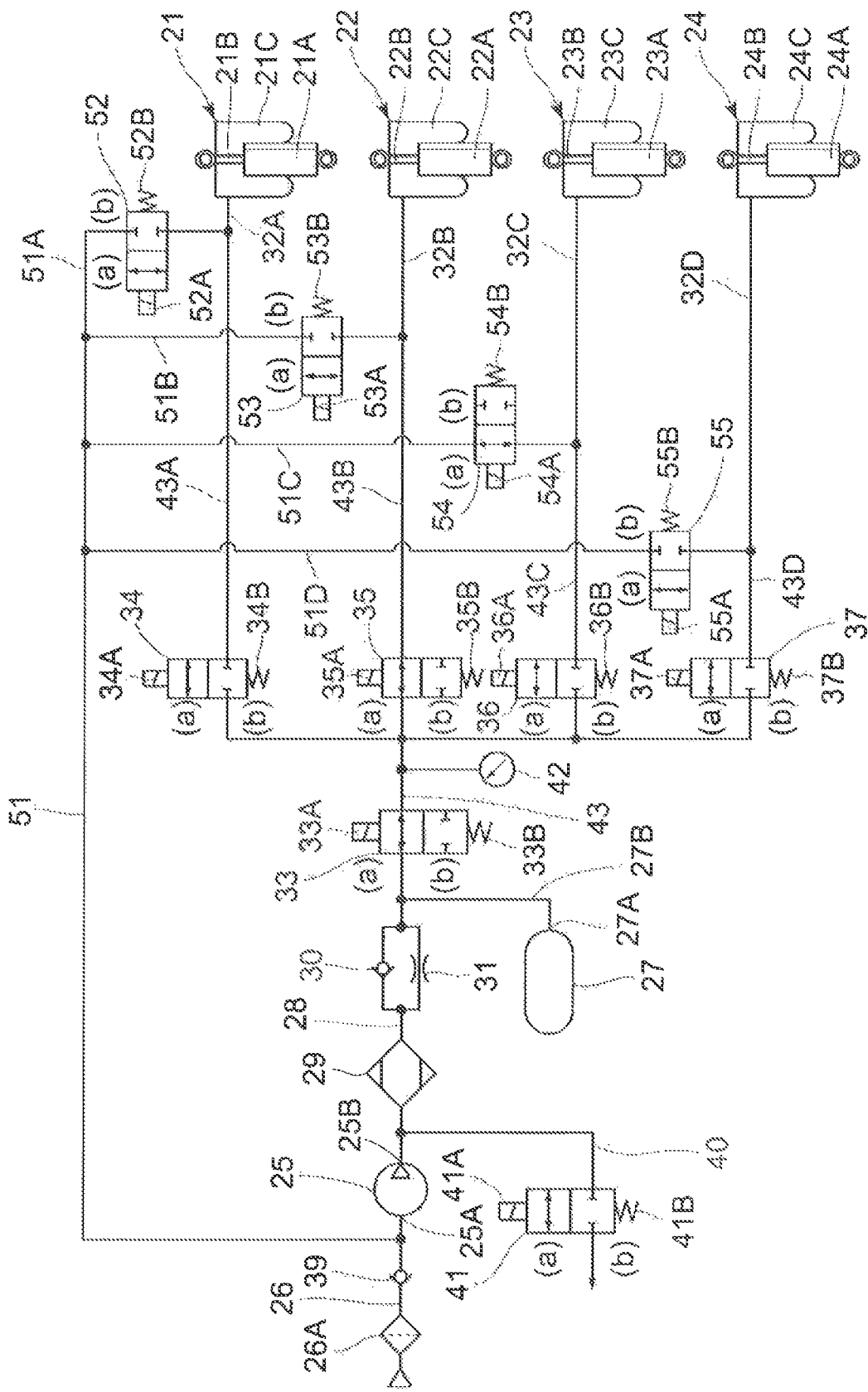
FIG. 10 is a circuit diagram illustrating a state where a left rear-side vehicle height of a vehicle is lowered by air suspensions.
Figure 11:
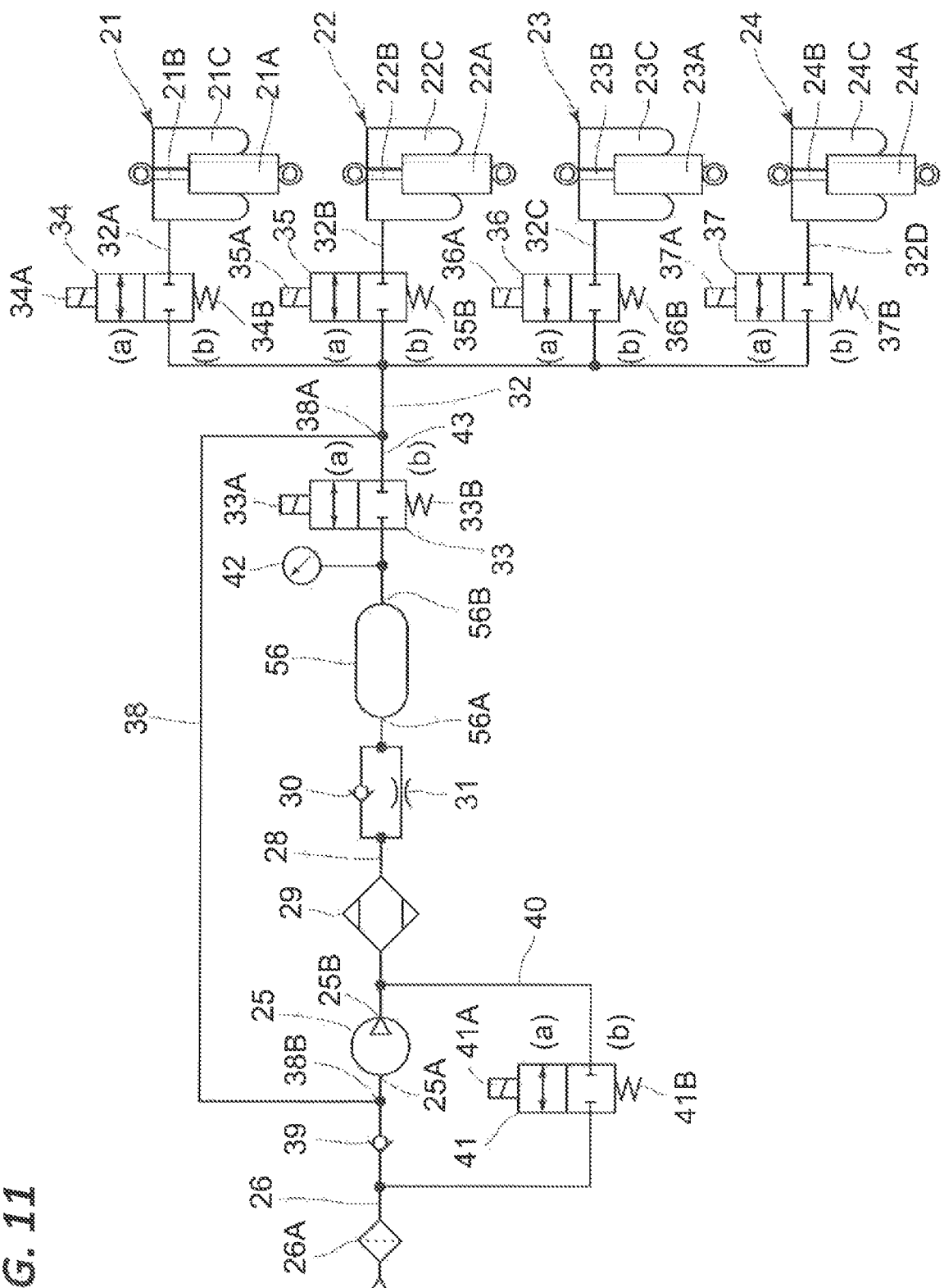
FIG. 11 is a circuit diagram illustrating an air suspension system according to a second modification.

Thereafter, FIGS. 8 to 10 illustrate a third exemplary embodiment of the present invention. The third exemplary embodiment is characterized in that a plurality of discharge passages are provided in air supply passages, in which each of the discharge passages is connected between each suspension control valve and each air suspension and connected to the intake side of the compressor, and each discharge valve is provided in the middle of each discharge passage to open and close the discharge passage. In the third exemplary embodiment, the same reference numerals are given to the same constituent elements as those of the second exemplary embodiment, and the descriptions thereof will be omitted.

The air suspension system according to the third exemplary embodiment is configured to include a plurality of (four) air suspensions 21, 22, 23, and 24, a compressor 25, a tank 27, a replenishment passage 28, an air supply passage 43, an air supply valve 33, respective branch air supply passages 43A to 43D, and a plurality of (four) suspension control valves 34, 35, 36, and 37 as control valves in substantially the same manner as in the second exemplary embodiment. In this case, the air suspensions 21 to 24 and the suspension control valves 34 to 37 are provided in the branch air supply passages 43A to 43D.

The air suspension system according to the third exemplary embodiment is different from the air suspension system according to the second exemplary embodiment in that branch discharge passages 51A, 51B, 51C, and 51D and discharge valves 52, 53, 54, and 55 to be described below are provided corresponding to the four air suspensions 21, 22, 23, and 24.

A discharge passage 51 is split into four branch discharge passages 51A, 51B, 51C, and 51D to connect respective air chambers 21C, 22C, 23C, and 24C of the air suspensions 21, 22, 23, and 24 to an intake side of the compressor 25. Here, the four branch discharge passages 51A, 51B, 51C, and 51D are provided in parallel to the branch air supply passages 43A, 43B, 43C, and 43D, respectively. The branch discharge passages 51A, 51B, 51C, and 51D merge into the discharge passage SI to connect to an atmosphere introduction passage 26 between a suction port 25A of the compressor 25 and a second check valve 39.

The discharge valve 52 is provided in the middle of the branch discharge passage 51A to open/close the branch discharge passage 51A. The discharge valve 52 is constituted by a 2-port 2-position solenoid valve, and switches between a valve opening position (a) where air within the air chamber 21C of the air suspension 21 is discharged to the branch discharge passage 51A, and a valve close position (b) where air is kept in the air chamber 21C of the air suspension 21. The discharge valve 52 keeps the valve close position (b) by a spring 52B when a solenoid 52A is not excited, and switches to the valve opening position (a) when the solenoid 52A is excited.

The discharge valve 53 is provided in the middle of the branch discharge passage 51B to open/close the branch discharge passage 51B. The discharge valve 53 is constituted by a 2-port 2-position solenoid valve, and switches between a valve opening position (a) where air within the air chamber 22C of the air suspension 22 is discharged to the branch discharge passage 51B, and a valve close position (b) where air is kept in the air chamber 22C of the air suspension 22.

The discharge valve 54 is provided in the middle of the branch discharge passage 51C to open/close the branch discharge passage 51C. The discharge valve 54 is constituted by a 2-port 2-position solenoid valve, and switches between a valve opening position (a) where air within the air chamber 23C of the air suspension 23 is discharged to the branch discharge passage SIC, and a valve close position (b) where air is kept in the air chamber 23C of the air suspension 23.

The discharge valve 55 is provided in the middle of the branch discharge passage 51D to open/close the branch discharge passage 51D. The discharge valve 55 is constituted by a 2-port 2-position solenoid valve, and switches between a valve opening position (a) where air within the air chamber 24C of the air suspension 24 is discharged to the branch discharge passage 51D, and a valve close position (b) where air is kept in the air chamber 24C of the air suspension 24.

Then, as in the discharge valve 52, the discharge valves 53, 54, and 55 keep the valve close positions (b) by springs 53B, 54B, and 55B when solenoids 53A, 54A, and 55A are not excited, and switch to valve opening positions (a) when the solenoids 53A, 54A, and 55A are excited. In this manner, the four branch discharge passages 51A, 51B, 51C, and 51D, and the four discharge valves 52, 53, 54, and 55 are connected in parallel to the discharge passage 51.

Here, in the air suspension system according to the third exemplary embodiment, a simultaneous valve-opening of the suspension control valve 34 and the discharge valve 52 connected to the air suspension 21 is not generally performed. Similarly, a simultaneous valve-opening of the suspension control valve 35 and the discharge valve 53 connected to the air suspension 22, a simultaneous valve-opening of the suspension control valve 36 and the discharge valve 54 connected to the air suspension 23, and a simultaneous valve-opening of the suspension control valve 37 and the discharge valve 55 connected to the air suspension 24 are not generally performed.

Meanwhile, the air suspension system according to the third exemplary embodiment has a configuration in which the respective solenoids 34A to 37A of the suspension control valves 34 to 37 and the respective solenoids 52A to 55A of the discharge valves 52 to 55 may be selectively excited by a controller (not illustrated) such that one of the suspension control valves 34 to 37 connected to one air suspension among the respective air suspensions 21 to 24, and any of the discharge valves 52 to 55 connected to other air suspensions 21 to 24 may be simultaneously valve-opened.

For example, the suspension control valve 34 and the discharge valves 53, 54, and 55, the suspension control valves 34 and 35 and the discharge valves 54 and 55, the suspension control valves 34 and 36 and the discharge valves 53 and 55, the suspension control valves 34 and 37 and the discharge valves 53 and 54, the suspension control valves 34, 35, and 36 and the discharge valve 55, the suspension control valves 34, 35, and 37 and the discharge valve 54, the suspension control valves 34, 36, and 37 and the discharge valve 53 may be simultaneously valve-opened, respectively. Similarly, the suspension control valve 35 and the discharge valves 52, 54, and 55, the suspension control valves 35 and 36 and the discharge valves 52 and 55, the suspension control valves 35 and 37 and the discharge valves 52 and 54, the suspension control valves 35, 36, and 37 and the discharge valve 52, the suspension control valve 36 and the discharge valves 52, 53, and 55, the suspension control valves 36 and 37 and the discharge valves 52 and 53, and the suspension control valve 37 and the discharge valves 52, 53, and 54 may be simultaneously valve-opened, respectively.

Accordingly, the air suspension system according to the third exemplary embodiment is configured such that when the air supply valve 33 is switched to the valve opening position (a) and the compressor 25 is operated, raising/lowering of the vehicle height using the respective air suspensions 21 to 24 may be independently simultaneously performed.

An air suspension system according to the third exemplary embodiment has the above described configuration, and an operation thereof will be described below.

First, in the case where the vehicle height is increased by the respective air suspensions 21 to 24 (an air supply mode), in a state where the compressor 25 is stopped, the respective discharge valves 52, 53, 54, and 55 are kept at the valve close positions (b), and the air supply valve 33 and the respective suspension control valves 34, 35, 36, and 37 are switched to the valve opening positions (a).

Accordingly, the compressed air in the tank 27 is led to the air supply passage 43, and the compressed air is supplied into the air chamber 21C of the air suspension 21 through the branch air supply passage 43A and the branch supply/discharge passage 32A, into the air chamber 22C of the air suspension 22 through the branch air supply passage 43B and the branch supply discharge passage 32B, into the air chamber 23C of the air suspension 23 through the branch air supply passage 43C and the branch supply discharge passage 32C, and into the air chamber 24C of the air suspension 24 through the branch air supply passage 43D and the branch supply/discharge passage 32D, respectively. In this manner, the compressed air stored in the tank 27 may be supplied into the air chambers 21C to 24C so as to extend the air suspensions 21 to 24. Then, after a raising operation of the vehicle height is completed, the air supply valve 33 or each of the suspension control valves 34 to 37 is switched to the valve close position (b) so that the air suspensions 21 to 24 may be maintained in an extended state, and the vehicle height may be maintained in a raised state.

Meanwhile, in the case where the vehicle height is lowered (a discharge mode), the air supply valve 33 or each of the suspension control valves 34, 35, 36, and 37 is kept at the valve close position (b), and the respective discharge valves 52, 53, 54, and 55 are switched to the valve opening positions (a). Then, the compressor 25 is operated.

Accordingly, the air within the air chamber 21C of the air suspension 21 is led from the branch supply/discharge passage 32A to the branch discharge passage 51A, the air within the air chamber 22C of the air suspension 22 is led from the branch supply/discharge passage 32B to the branch discharge passage 51B, the air within the air chamber 23C of the air suspension 23 is led from the branch supply/discharge passage 32C to the branch discharge passage 51C, and the air within the air chamber 24C of the air suspension 24 is led from the branch supply/discharge passage 32D to the branch discharge passage 51D.

Then, the air led to the branch discharge passages 51A, 51B, 51C, and 51D is guided to the suction port 25A of the compressor 25 via the atmosphere introduction passage 26 without being released to the atmosphere, compressed by the compressor 25, and supplied into the tank 27 through the replenishment passage 28 and the air dryer 29. As a result, the air is discharged from the air chambers 21C to 24C of the air suspensions 21 to 24, and the air suspensions 21 to 24 are shifted to a retracted state so that the vehicle height can be lowered.

Meanwhile, in the air suspension system according to the third exemplary embodiment, the raising/lowering of the vehicle height using the respective air suspensions 21 to 24 may be independently simultaneously performed so as to improve a ride comfort during running of the vehicle. Hereinafter, descriptions will be made on a raising/lowering operation of the vehicle height using the respective air suspensions 21 to 24 during turning of the vehicle.

First, when a vehicle whose the front side weight is larger than the rear side weight is turning, in the case where, for example, the air suspension 21 of the left front wheel (FL) and the air suspension 23 of the left rear wheel (RL) are simultaneously retracted and thus the vehicle height at the left side is lowered, the air suspension 21 is retracted more than the air suspension 23 by a weight difference. Then, in the case where the air suspension 22 of the right front wheel (FR) and the air suspension 24 of the right rear wheel (RR) are simultaneously extended, and thus the vehicle height increases at the right side, the air suspension 24 is extended more than the air suspension 22 by a weight difference. As a result, the ride comfort during turning is deteriorated due to not only leftward tilting of the vehicle, but also forward tilting of the vehicle.

Whereas, for example, in the case where, the retraction of the air suspension 21 of the left front wheel and the extension of the air suspension 24 of the right rear wheel are simultaneously performed, and then, the extension of the air suspension 22 of the right front wheel and the retraction of the air suspension 23 of the left rear wheel are simultaneously performed, the vehicle does not tilt forwards but tilts only in the left-right direction so that it as possible to improve a ride comfort during turning.

Therefore, the extension and retraction operations of the respective air suspensions 21 to 24 during turning as described above will be described with reference to FIGS. 9 and 10.

First, as illustrated in FIG. 9, the suspension control valve 35 and the discharge valve 53 connected to the air suspension 22 are kept at the valve close positions (b), and the suspension control valve 36 and the discharge valve 54 connected to the air suspension 23 are kept at the valve close positions (b). Meanwhile, the suspension control valve 34 connected to the air suspension 21 is kept at the valve close position (b), and the discharge valve 52 is switched to the valve opening position (a), and the suspension control valve 37 connected to the air suspension 24 is switched to the valve opening position (a), and the discharge valve 55 is kept at the valve close position (b). In this state, the air supply valve 33 is switched to the valve opening position (a) and the compressor 25 is operated.

Accordingly, the air within the air chamber 21C of the air suspension 21 is discharged (supplied) into the tank 27, and the compressed air is supplied into the air chamber 24C of the air suspension 24 from the tank 27. As a result, the retraction operation of the air suspension 21 of the left front wheel and the extension operation of the air suspension 24 of the right rear wheel are simultaneously performed, and the left-front side vehicle height of the vehicle is lowered.

Then, as illustrated in FIG. 10, the suspension control valve 34 and the discharge valve 52 connected to the air suspension 21 are kept at the valve close positions (b), and the suspension control valve 37 and the discharge valve 55 connected to the air suspension 24 are kept at the valve close positions (b). Meanwhile, the suspension control valve 35 connected to the air suspension 22 is switched to the valve opening position (a) and the discharge valve 53 is kept at the valve close position (b), and the suspension control valve 36 connected to the air suspension 23 is kept at the valve close position (b) and the discharge valve 54 is switched to the valve opening position (a). In this state, the air supply valve 33 is switched to the valve opening position (a) and the compressor 25 is operated.

Accordingly, the air within the air chamber 23C of the air suspension 23 is discharged (supplied) into the tank 27, and the compressed air is supplied into the air chamber 22C of the air suspension 22 from the tank 27. As a result, the extension operation of the air suspension 22 of the right front wheel and the retraction operation of the air suspension 23 of the left rear wheel are simultaneously performed, and the left-rear side vehicle height of the vehicle is lowered.

Then, the above described control mode (a control mode of FIG. 9) in which the retraction operation of the air suspension 21 and the extension operation of the air suspension 24 are simultaneously performed, and a control mode (a control mode of FIG. 10) in which the extension operation of the air suspension 22 and the retraction operation of the air suspension 23 are simultaneously performed may be repeatedly executed, so that the vehicle does not tilt forwards but tilts only in the left-right direction and as a result, it is possible to improve a ride comfort during turning.

Next, at the time of start of the vehicle, for example, the suspension control valves 34 and 35 of the air suspensions 21 and 22 are kept at the valve close positions (b), and the discharge valves 52 and 53 are switched to the valve opening positions (a). The suspension control valves 36 and 37 of the air suspensions 23 and 24 are switched to the valve opening positions (a), and the discharge valves 54 and 55 are kept at the valve close positions (b). In this state, the air supply valve 33 is switched to the valve opening position (a), and the compressor 25 is operated.

Accordingly, the retraction operation of the air suspensions 21 and 22 and the extension operation of the air suspensions 23 and 24 are simultaneously performed so that the front side vehicle height of the vehicle may be lowered and the rear side vehicle height may be raised. As a result, the vehicle may be inclined to the front side, and the lifting of the front side of the vehicle may be suppressed at the time of starting so that it is possible to improve the ride comfort.

Meanwhile, at the time of braking of the vehicle, for example, the suspension control valves 34 and 35 of the air suspensions 21 and 22 are switched to the valve opening positions (a), and the discharge valves 52 and 53 are kept at the valve close positions (b). The suspension control valves 36 and 37 of the air suspensions 23 and 24 are kept at the valve close positions (b), and the discharge valves 54 and 55 are switched to the valve opening positions (a). In this state, the air supply valve 33 is switched to the valve opening position (a) and the compressor 25 is operated.

Accordingly, the extension operation of the air suspensions 21 and 22 and the retraction operation of the air suspensions 23 and 24 are simultaneously performed so that the front side vehicle height of the vehicle may be raised and the rear side vehicle height may be lowered. As a result, the vehicle may be inclined to the rear side, and forward plunging may be suppressed at the time of braking of the vehicle so that it is possible to improve the ride comfort.

In this manner, in the air suspension system according to the third exemplary embodiment, the air suspension 21 is connected to the suspension control valve 34 and the discharge valve 52, the air suspension 22 is connected to the suspension control valve 35 and the discharge valve 53, the air suspension 23 is connected to the suspension control valve 36 and the discharge valve 54, and the air suspension 24 is connected to the suspension control valve 37 and the discharge valve 55 so that raising/lowering of the vehicle height using the respective air suspensions 21 to 24 may be independently simultaneously performed.

Accordingly, the extension operation and the retraction operation of the air suspensions 21 to 24 may be properly combined so that an optimum vehicle height adjustment may be performed at the time of turning, starting, and braking of the vehicle. As a result, a good ride comfort may be always obtained regardless of the running state of the vehicle.

Meanwhile, the air suspension system according to the third exemplary embodiment also may be configured using one tank 27 and one air supply valve 33, and thus the number of components in the entire system may be reduced. As a result, it is possible to simplify the air suspension system as a whole, and to reduce the installation space at the time of mounting on the vehicle.

The air supply valve 33, the respective suspension control valves 34 to 37, and the respective discharge valves 52 to 55 in the third exemplary embodiment correspond to a valve mechanism of the present invention.

In the second exemplary embodiment, a case where the tank 27 having one inflow/outflow port 27A serving as an inflow port and an outflow port is used, and the branch passage 27B connected to the inflow/outflow port 27A of the tank 27 is connected to the replenishment passage 28 and the air supply passage 43 is exemplified. A case where the pressure sensor 42 is located between the air supply valve 33 and the respective suspension control valves 34 to 37 to connect to a contact point between the air supply passage 43 and the supply/discharge passage 32 is exemplified. A case where one end of the atmospheric release passage 40 is connected to the replenishment passage 28, and the other end is an open end is exemplified. When the pressure sensor 42 is located between the air supply valve 33 and the respective suspension control valves 34 to 37 to be connected in the middle of the air supply passage 43, it is possible to detect the pressure within each of the air suspensions 21 to 24.

However, the present invention as not limited thereto. For example, as in a second modification illustrated in FIG. 11, a tank 56 having an inflow port 56A connected to the replenishment passage 28 and an outflow port 56B connected to the air supply passage 43 may be connected in series between the replenishment passage 28 and the air supply passage 43. The pressure sensor 42 may be connected in the middle of the air supply passage 43 between the tank 56 and the air supply valve 33. When the pressure sensor 42 is provided at this position, it is possible to immediately check the pressure within the tank 27. When the pressure sensor 42 is provided at the position as illustrated in the second exemplary embodiment, it is possible to obtain the pressure within the tank 27 by stopping the compressor 25 and valve-opening the air supply valve 33. Two pressure sensors 42 may be provided at the position illustrated in the second exemplary embodiment, and the position illustrated in the second modification, respectively. A configuration in which the other end of the atmospheric release passage 40 is connected to a position between the intake filter 26A and the second check valve 39 in the atmosphere introduction passage 26 may be employed.

Figure 12:
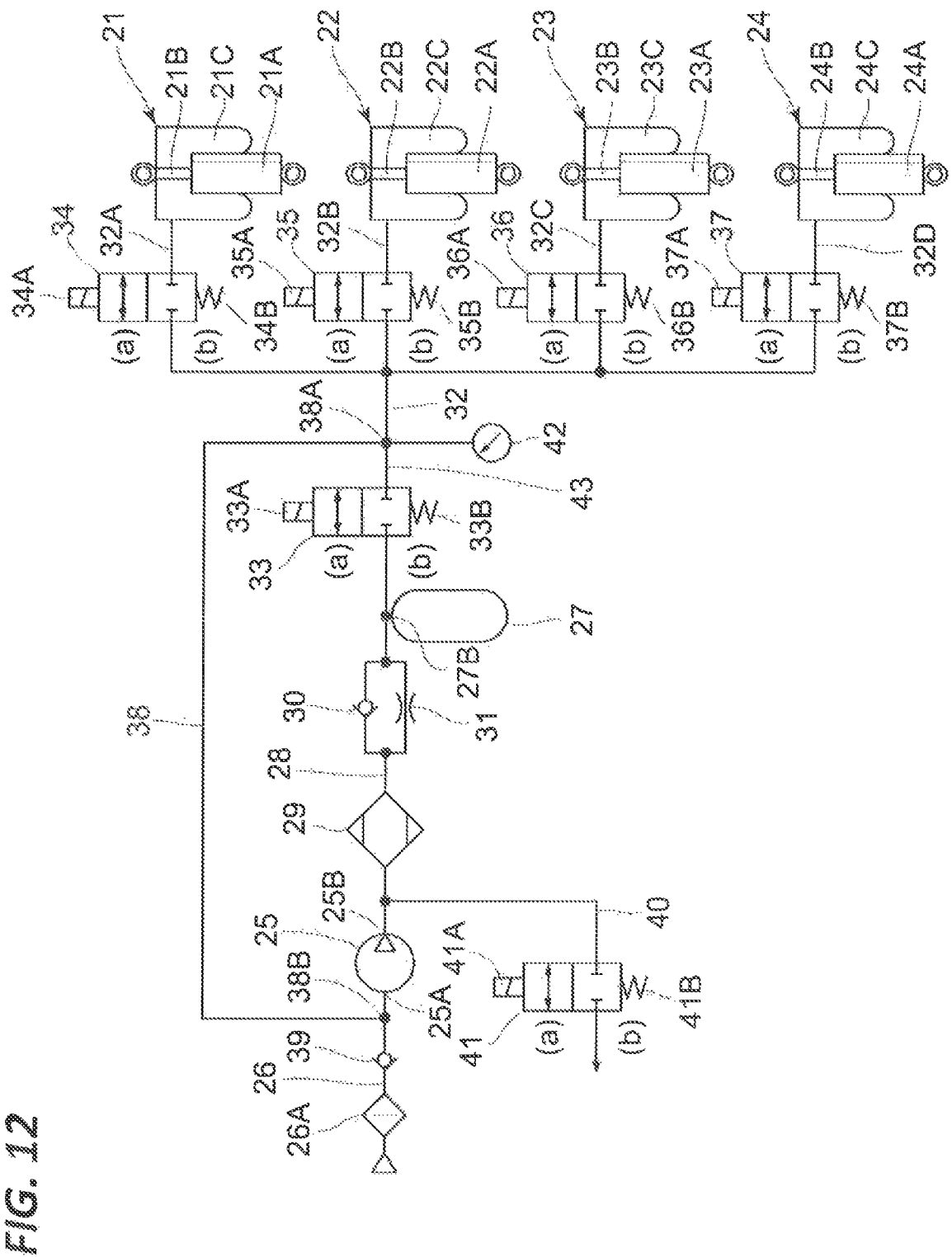
FIG. 12 is a circuit diagram illustrating an air suspension system according to a third modification.
Figure 13:
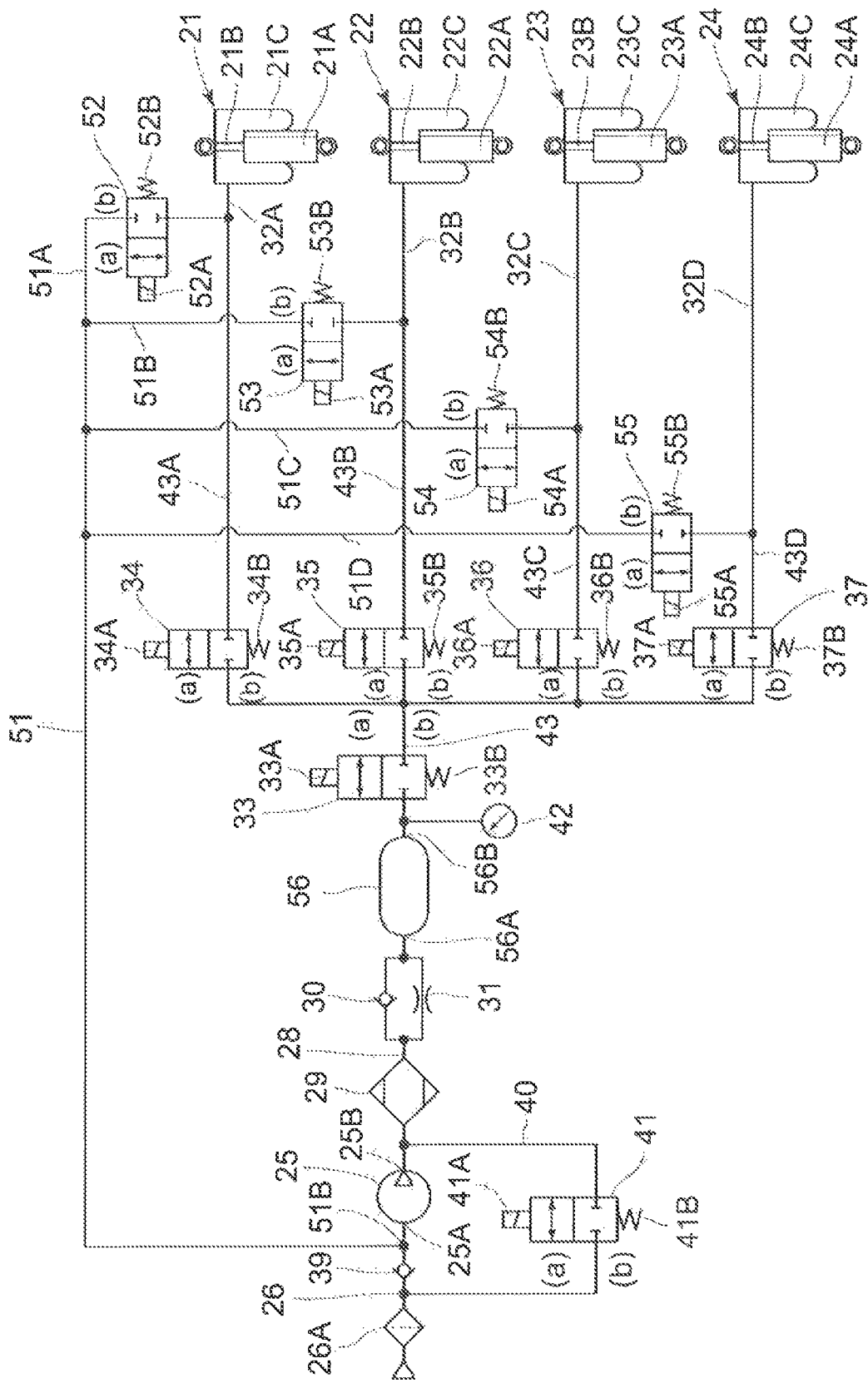
FIG. 13 is a circuit diagram illustrating an air suspension system according to a fourth modification.

For example, as in the third modification illustrated in FIG. 12, a configuration in which the branch passage 27B of the tank 27 as made as short as possible, and the inflow/outflow port 27A of the tank 27 is directly connected to the replenishment passage 28 and the air supply passage 43 may be employed.

In the third exemplary embodiment as well, a case where the tank 27 having one inflow/outflow port 27A is used, and the branch passage 27B connected to the inflow/outflow port 27A of the tank 27 is connected to the replenishment passage 28 and the air supply passage 43 is exemplified. A case where the pressure sensor 42 is connected to a position between the air supply valve 33 and the respective suspension control valves 34 to 37 in the air supply passage 43 is exemplified. A case where one end of the atmospheric release passage 40 is connected to the replenishment passage 28, and the other end is an open end is exemplified.

However, the present invention is not limited thereto. For example, as in the fourth modification illustrated in FIG. 13, a tank 56 having an inflow port 56A connected to the replenishment passage 28 and an outflow port 56B connected to the air supply passage 43 may be connected in series between the replenishment passage 28 and the air supply passage 43, and the pressure sensor 42 may be located between the tank 56 and the air supply valve 33 to be connected in the middle of the air supply passage 43. A configuration in which the other end of the atmospheric release passage 40 is connected to a position between the intake filter 26A and the second check valve 39 in the atmosphere introduction passage 26 may be employed.

The compressor 25 of the present invention may be a reciprocating-type compressor, or a rotator-type compressor such as a scroll.

DESCRIPTION OF SYMBOLS 1, 2, 21, 22, 23, 24: air suspension, 3, 25: compressor
4, 26A: intake filter, 5, 27, 56: tank
27A: inflow/outflow port, 27B: branch passage
56A: inflow port, 56B: outflow port
6, 28: replenishment passage, 8: first check valve
9: supply/discharge passage, 10: supply/discharge switching valve

| | |
|---|---|
| 11, 12, 34, 35, 36, 37: suspension control valve, | |
| 13, 38, 51: discharge passage, | 14: discharge passage open/close valve |
| 15: second check valve, | 16: bypass passage |
| 17: third check valve, | 18, 40: atmospheric release passage |
| 19, 41: atmospheric release valve, | 7, 29: air dryer |
| 30: check valve, | 31: orifice |
| 32: supply/discharge passage, | 33: air supply valve |
| 52, 53, 54, 55: discharge valve | |

What is claimed is:

1. An air suspension system comprising:
a plurality of air suspensions interposed between a vehicle body and an axle and configured to adjust a vehicle height according to supply/discharge of air;
a compressor configured to compress the air; and
a tank configured to store the air compressed by the compressor,
a replenishment passage which connects the compressor and the tank;
a first check valve provided in the middle of the replenishment passage to allow a flow of air from the compressor to the tank and prevent a flow in an opposite direction thereof;
a supply/discharge passage which connects the tank and the plurality of air suspensions;
a supply/discharge switching valve provided in the middle of the supply/discharge passage to switch between a supply position which supplies air to the plurality of air suspensions and a discharge position which discharges air in the plurality of air suspensions;
a plurality of suspension control valves each provided on the supply/discharge passage between the supply/discharge switching valve and one of the plurality of air suspensions to open/close the supply/discharge passage so as to control expansion and compression of the respective one of the plurality of air suspensions;
a discharge passage comprising one end connected to the supply/discharge switching valve and another end connected to a suction side of the compressor;
a second check valve connected to an intake filter which sucks outside air, wherein the second check valve is provided between the intake filter and an intake side of the compressor, the second check being configured to allow a flow of air directed to the compressor and prevent a flow in an opposite direction thereof;
a bypass passage comprising one end connected to the discharge passage and another end connected to the replenishment passage between the compressor and the first check valve;
a third check valve provided in the middle of the bypass passage to allow a flow of air directed from the discharge passage to the replenishment passage and prevent a flow in an opposite direction thereof;
an atmospheric release passage comprising one end connected to the replenishment passage at a location between a discharge port of the compressor and the first check valve, and another end connected to a location between the intake side of the compressor and the second check valve;
an atmospheric release valve provided in the middle of the atmospheric release passage, and opens/closes the atmospheric release passage;
wherein the air suspension system has a discharge mode, an air supply mode, and an atmospheric discharge mode, wherein,
in the discharge mode, the supply/discharge switching valve is switched to a discharge position to open the supply/discharge passage by the suspension control valve, to close the atmospheric release passage, and the compressor is driven, and the compressed air within the air suspensions is compressed and supplied into the tank through the discharge passage and the replenishment passage so as to lower the vehicle height,
in the air supply mode, the supply/discharge switching valve is switched to a supply position to open the supply/discharge passage by the suspension control valve such that the compressed air within the tank is supplied through the supply/discharge passage to the air suspensions in a state where the compressor is stopped so as to raise the vehicle height, and
in the atmospheric discharge mode, the supply/discharge switching valve is switched to a discharge position to open the supply/discharge passage by the suspension control valve, to open the atmospheric release passage, and the compressed air within the air suspensions is discharged through the discharge passage and the bypass passage to the atmospheric release passage so as to lower the vehicle height.

2. The air suspension system of claim 1, further comprising a dryer provided at a location between the compressor and the another end of the bypass passage, to dry the compressed air from the compressor.

3. The air suspension system of claim 1, further comprising:
a discharge passage opening/closing valve provided in the middle of the discharge passage, to open/close the discharge passage.

* * * * *